(12) United States Patent
Shirai et al.

(10) Patent No.: US 7,704,157 B2
(45) Date of Patent: Apr. 27, 2010

(54) GOLF SWING-MEASURING SYSTEM

(75) Inventors: Yoshiaki Shirai, Osaka (JP); Nobutaka Shimada, Osaka (JP); Masahiko Ueda, Hyogo (JP); Masahide Onuki, Hyogo (JP)

(73) Assignee: SRI Sports Limited, Kobe (JP)

( * ) Notice: Subject to any disclaimer, the term of this patent is extended or adjusted under 35 U.S.C. 154(b) by 1161 days.

(21) Appl. No.: 11/089,230

(22) Filed: Mar. 25, 2005

(65) Prior Publication Data

US 2005/0215337 A1 Sep. 29, 2005

(30) Foreign Application Priority Data

Mar. 26, 2004 (JP) ............................. 2004-090788
Mar. 26, 2004 (JP) ............................. 2004-091738

(51) Int. Cl.
*A63B 69/36* (2006.01)
*A63B 57/00* (2006.01)
*A63B 67/02* (2006.01)

(52) U.S. Cl. .................. 473/267; 473/140; 473/152; 473/207; 473/222; 473/266; 473/409; 434/252

(58) Field of Classification Search ............... 473/140, 473/207–217, 219–225, 266–277, 409, 151–156; 434/252, 247–251
See application file for complete search history.

(56) References Cited

U.S. PATENT DOCUMENTS

| | | | | |
|---|---|---|---|---|
| 4,531,187 A | * | 7/1985 | Uhland | 463/12 |
| 4,656,507 A | * | 4/1987 | Greaves et al. | 348/26 |
| 4,688,105 A | * | 8/1987 | Bloch et al. | 386/38 |
| 4,843,568 A | * | 6/1989 | Krueger et al. | 382/100 |
| 4,896,364 A | * | 1/1990 | Lohscheller | 382/162 |
| 4,955,064 A | * | 9/1990 | Shirasaka et al. | 382/242 |
| 5,034,811 A | * | 7/1991 | Palm | 348/154 |

(Continued)

FOREIGN PATENT DOCUMENTS

EP 0 447 712 A3 9/1991

(Continued)

OTHER PUBLICATIONS

Translation of Tanaka, et al. (JP 63-038478 A, application JP 61-180117).*

*Primary Examiner*—Peter DungBa Vo
*Assistant Examiner*—Matthew D. Hoel
(74) *Attorney, Agent, or Firm*—Birch, Stewart, Kolasch & Birch, LLP

(57) ABSTRACT

A golf swing-measuring system including a computer (16) for capturing a colored moving image obtained by photographing a golfer (11) who swings by gripping a golf club (13). The computer (16) selects and extracts one or more images each showing a swing posture as check-point images such as an address image, a take-back shaft 8 o'clock image, a take-back shaft 9 o'clock image, a take-back unskillful arm horizontal image, a top image, a downswing unskillful arm horizontal image, a downswing shaft 9 o'clock image, an impact image, a follow-through shaft 3 o'clock image, and a finish image and extracts from a large number of still images constituting said color moving image. Thereafter the computer (16) obtains coordinates of positions of attention-focused points that operate in said check-point images when said golfer swings.

8 Claims, 25 Drawing Sheets

U.S. PATENT DOCUMENTS

| | | |
|---|---|---|
| 5,111,410 A | 5/1992 | Nakayama et al. |
| 5,257,116 A * | 10/1993 | Suzuki ........................ 358/465 |
| 5,294,978 A * | 3/1994 | Katayama .............. 375/240.12 |
| 5,311,336 A * | 5/1994 | Kurita et al. ................. 358/538 |
| 5,333,061 A | 7/1994 | Nakashima et al. |
| 5,343,538 A * | 8/1994 | Kasdan ........................ 382/165 |
| 5,375,177 A * | 12/1994 | Vaidyanathan et al. ....... 382/291 |
| 5,398,292 A * | 3/1995 | Aoyama ...................... 382/199 |
| 5,444,798 A * | 8/1995 | Enomoto et al. ............. 382/199 |
| 5,459,793 A * | 10/1995 | Naoi et al. ................... 382/165 |
| 5,595,389 A * | 1/1997 | Parulski et al. ................ 463/31 |
| 5,651,548 A * | 7/1997 | French et al. .................. 463/25 |
| 5,772,522 A | 6/1998 | Nesbit et al. |
| 5,781,647 A * | 7/1998 | Fishbine et al. .............. 382/100 |
| 5,930,406 A * | 7/1999 | Itsuzaki et al. ............... 382/291 |
| 5,941,769 A | 8/1999 | Order ........................... 463/12 |
| 6,488,591 B1 * | 12/2002 | Gobush et al. ............... 473/199 |
| 6,532,297 B1 * | 3/2003 | Lindquist .................... 382/100 |
| 6,616,543 B1 * | 9/2003 | Gobush et al. ............... 473/199 |
| 7,283,647 B2 * | 10/2007 | McNitt ....................... 382/107 |
| 7,291,072 B2 * | 11/2007 | Bissonnette et al. .......... 473/198 |
| 2002/0114493 A1 | 8/2002 | McNitt et al. |
| 2002/0187846 A1 | 12/2002 | Funk |
| 2004/0095352 A1 * | 5/2004 | Huang ......................... 345/473 |
| 2005/0213076 A1 | 9/2005 | Saegusa |

FOREIGN PATENT DOCUMENTS

| | | |
|---|---|---|
| GB | 2 400 568 A | 10/2004 |
| GB | 2 400 569 A | 10/2004 |
| JP | 63-38478 A | 2/1988 |
| JP | 6-210027 A | 8/1994 |
| JP | 9-101125 A | 4/1997 |
| JP | 2794018 B2 | 6/1998 |
| JP | 2001-330882 A | 11/2001 |
| JP | 2003-117045 A | 4/2003 |
| WO | WO-99/35606 A1 | 7/1999 |

* cited by examiner

▒ : PIXEL ON CURRENT BOUNDARY

▩ : PIXEL IMMEDIATELY BEFORE CURRENT BOUNDARY

▨ : PIXEL ON NEXT BOUNDARY

| A | B | C |
|---|---|---|
| D | E | F |
| G | H | I |

Fig. 25
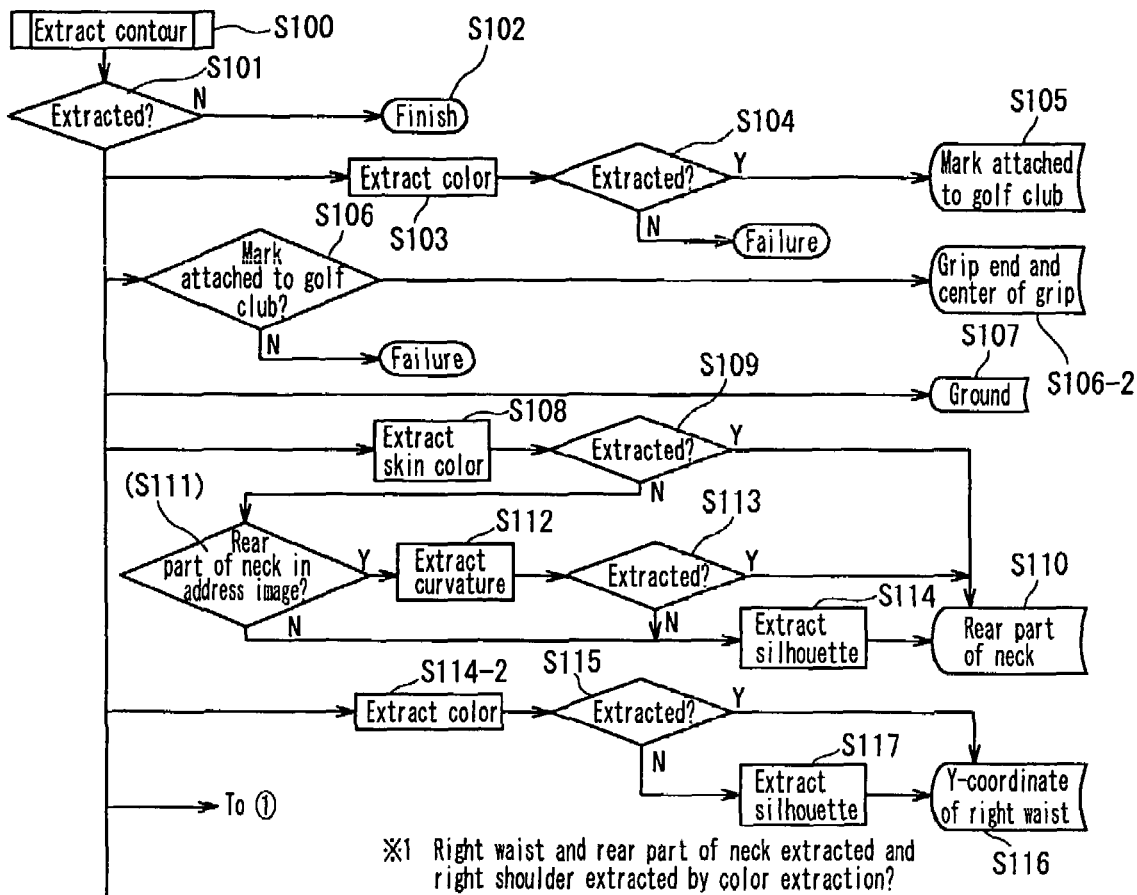
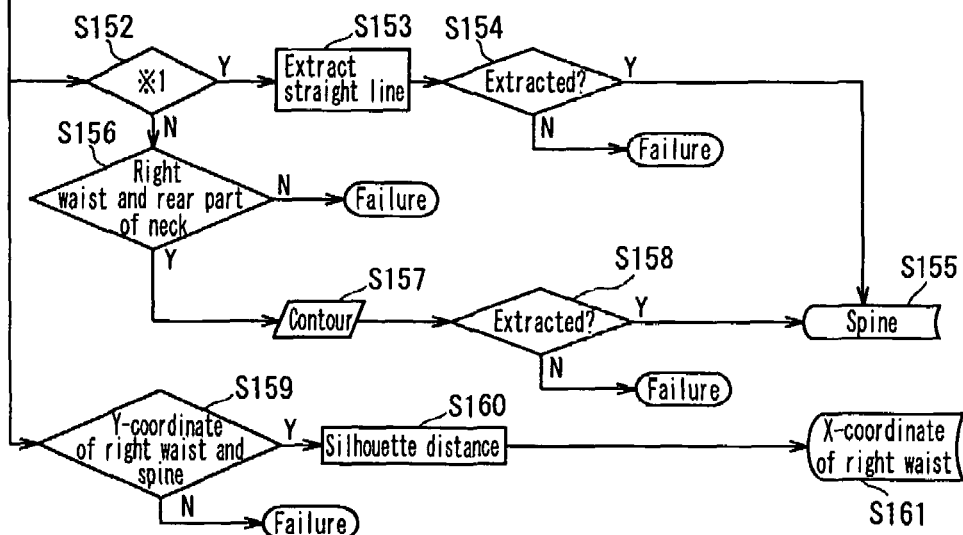

GOLF SWING-MEASURING SYSTEM

This nonprovisional application claims priority under 35 U.S.C. §119(a) on Patent Application No(s). 2004-090788 filed in Japan on Mar. 26, 2004 and 2004-091738 filed in Japan on Mar. 26, 2004, the entire contents of which are hereby incorporated by reference.

BACKGROUND OF THE INVENTION

1. Field of the Invention

The present invention relates to a golf swing-measuring system and more particularly to a system of automatically and accurately extracting the movement of golfer's joints and the like from images in which the golfer's swing is photographed.

2. Background Art

There are proposed various kinds of apparatuses for photographing a golfer's swing, automatically computing information such as a flight distance, orbit, and the like of a hit golf ball by a computer, and displaying the obtained information for a golfer. These apparatuses allow the golfer to examine the flight distance, orbit, and the like of the hit ball. However, these apparatuses are incapable of providing information useful for improving the golfer's swing form.

In the swing form diagnosis apparatus disclosed in Japanese Patent Application Laid-Open No. 2003-117045, a golfer's swing is photographed to extract images of only specific motion points important for diagnosing the swing form. More specifically, frames regarding the golfer's swing motion are extracted from the golfer's moving image photographed by the photographing means. Specific motion points during the swing motion are judged according to results of analysis of the moving partial images in the differential image between each frame and the reference image. A frame corresponding to each of the specific motion points is extracted to display the image.

However, even though a frame corresponding to each specific motion point during the swing motion is extracted, it is impossible to provide the golfer with the motion of the joints and the like during the swing by merely looking at an extracted image. Therefore it is difficult for the golfer to find defects in her/his swing form and points to be corrected.

In the motion diagnosis apparatus disclosed in U.S. Pat. No. 2,794,018, a plurality of motion points are mounted on a golf club head and a person whose swing is to be diagnosed to obtain the coordinates of the motion points in a swing moving image. Thereby the swing is diagnosed. But it is necessary to perform computations for extracting the coordinates of a large number of motion points for all frames of the swing moving image. Therefore the amount of computation is very large, and the coordinate of the position of each of the motion points is erroneously recognized to a high extent. Further there is a case in which the motion point is hidden with the golfer's arm and the like while the golfer is swinging. In this case, a camera is incapable of recognizing the motion points. Consequently it is impossible to obtain the coordinate of the position of each of the motion points. Thus there is a high probability that the swing is erroneously diagnosed.

In the above-described motion diagnosis apparatus, it is impossible to grasp the golfer's body motion in an image unless the motion points such as marks are mounted on a user's body. Thus the user has a troublesome preparatory work in diagnosing her/his swing. In addition, it is necessary to perform computations for extracting the coordinates of a large number of the motion points for all frames of the swing moving image. Therefore the amount of computation is very large, and the coordinates of the positions of the motion points are erroneously recognized to a high extent.

Patent document 1: Japanese Patent Application Laid-Open No. 2003-117045
Patent document 2: Patent No. 2794018

SUMMARY OF THE INVENTION

The present invention has been made in view of the above-described problems. Therefore it is an object of the present invention to reduce a computing time period and an erroneous recognition ratio in extracting attention-focused points of a golfer's body to analyze a swing motion.

To solve the above-described problems, there is provided a golf swing-measuring system including a computer for capturing a colored moving image obtained by photographing a golfer who swings by gripping a golf club. The computer selects and extracts one or more images each showing a swing posture as check-point images such as an address image, a take-back shaft 8 o'clock image, a take-back shaft 9 o'clock image, a take-back unskillful arm horizontal image, a top image, a downswing unskillful arm horizontal image, a downswing shaft 9 o'clock image, an impact image, a follow-through shaft 3 o'clock image, and a finish image and extracts from a large number of still images constituting said color moving image; and obtains coordinates of positions of attention-focused points that operate in said check-point images when said golfer swings.

In the above-described construction, after still images (check-point image) useful for diagnosing the golf swing are selectively extracted from a plurality of the still images, the coordinate of the position of each of the attention-focused points present on the golfer' body is obtained. Therefore it is unnecessary to obtain the coordinate of the position of each of the attention-focused points present on the golfer' body for all frames (still image) of a photographed moving image of the swing. Thus it is possible to reduce the cost required for computations. Further because the above-described construction allows computations to be performed only for the check-point images, the construction contributes to reduction of an erroneous recognition ratio of the attention-focused point.

The attention-focused point includes golfer's head, neck, shoulder, elbow, waist, knee, ankle, wrist or/and toe.

That is, by setting the above-described attention-focused point mainly on the joints, it is possible to obtain information useful for grasping the swing motion. The attention-focused point includes not only the golfer's joints and other parts, but also a colored mark mounted on a golf club shaft, a ball, and the like useful for diagnosing the swing.

A colored mark is provided on at least one of said attention-focused points. A search range which is a region in which presence of said colored mark is estimated is set in said check-point image. A color range which is an allowable range in which color information of a pixel in said image can be regarded as the same as that of a reference color of said colored mark is set. A coordinate of a position of each of said attention-focused points is obtained in said search range by regarding a pixel whose color falls in said color range as a position of said colored mark In the above-described construction, to detect the position of the colored mark, the entire image plane is not examined but only the search range is examined in judging whether the color information of a pixel in the image can be regarded as the same as the color information of the reference color of said colored mark. Therefore even though a still image includes a color approximate to the color of the colored mark, the color can be eliminated to thereby prevent an erroneous recognition from being made, and a computing period of time can be shortened. It is preferable to execute differential processing between the background image and pixels in the search range of the still image to eliminate the background image. Thereby even though a color approximate to the color of the colored mark is included in the background image inside the search range, the color can be eliminated to thereby prevent an erroneous recognition from being made.

Differential processing is executed between said check-point image and a background image in which a golfer is not photographed to obtain a golfer's silhouette and extract a contour of said silhouette. A pixel having an extreme value in an X-coordinate or a Y-coordinate of information of said obtained contour is specified as a coordinate of a position of said attention-focused point.

In this construction, in recognizing the attention-focused points present on the golfer' body in the check-point image, image processing allows automatic obtaining of the coordinate of the position of each of the attention-focused points present on the golfer' body in an image, even though colored marks or the like are not attached to the golfer. Therefore this construction eliminates the need for performing a troublesome work from the golfer whose swing is to be diagnosed by measuring her/his swing and hence can be used conveniently.

When recognition of the attention-focused points by using the colored marks has failed, the coordinate of the position of each of the attention-focused points is extracted by carrying out the method of specifying the coordinate of the position of each of the attention-focused points by using the extreme value of the contour or other methods. Thereby even though the colored marks become light or dark because they are hidden by the golfer's arm or shaded, the above-described construction is capable of improving the erroneous recognition ratio of the attention-focused point.

It is preferable to execute differential processing between said check-point image and a background image in which a golfer is not photographed to obtain a golfer's silhouette and extract a contour of said silhouette; and a pixel at which a curvature of said obtained contour takes an extreme value is specified as a coordinate of a position of said attention-focused point.

It is preferable that differential processing is executed between said check-point image and a background image in which a golfer is not photographed to obtain a golfer's silhouette and extract a contour of said silhouette, that a portion of said obtained contour where not less than a predetermined number of pixels having curvatures in a range from −10° to 10° are continuously present is obtained as a straight line portion, and that coordinate of a position of said attention-focused point is specified by using said straight line portion.

The above-described construction allows extraction of the coordinate of the position of the joint present between a thigh and a shank comparatively straight. The above-described construction allows the coordinate of the position of the joint to be specified without using the curvature of the obtained contour. Therefore the above-described construction allows recognition of the joint at which the curvature of the golfer's contour is not high. In view of extraction accuracy, it is preferable that the numerical range of the curvature that is used as the reference for judging whether or not an aggregated region of pixels is the straight line portion is set to the range from −10° to 10°.

It is preferable that a pixel present at a position where an extension of said straight line portion intersects with said contour is specified as a coordinate of a position of said attention-focused point. It is also preferable that a pixel present at a position where extensions of two of said straight line portions intersect with each other or a point of a contour present nearest to said intersection position is specified as a coordinate of a position of said attention-focused point.

A pixel which makes a change amount of brightness between said pixel and an adjacent pixel more than a threshold is set as an edge. The edge is extracted for a golfer in said check-point image. A coordinate of a position of said attention-focused point is specified by using said edge.

If the attention-focused point is present inside the contour of the golfer's silhouette, the attention-focused point cannot be recognized by using the information of the contour. But the above-described construction allows extraction of a golfer's body line which cannot be recognized by only the extraction of the contour obtained from the golfer's silhouette. Therefore it is possible to specify the attention-focused point by using the golfer's body line present inside the contour, namely, the edge.

The present invention provides a golf swing-measuring system including a computer for capturing a colored moving image obtained by photographing a golfer who swings by gripping a golf club. The computer sets a color range which is an allowable range in which a color of a pixel can be regarded as the same color as a golfer's skin color. The computer executes skin extraction by regarding color information of a pixel which is included in a plurality of still images constructing said color moving image and falls in said color range as said golfer's skin color region. The computer obtains a coordinate of a position of said attention-focused point present on said golfer's body from said extracted skin color region.

In the above-described construction, in recognizing the attention-focused point present on the golfer' body in the still image constructing the colored moving image, it is possible to obtain the coordinate of the position of the attention-focused point present on the golfer' body in the image by extracting the skin color region of the golfer's body, even through colored marks or the like are not attached to the golfer. Therefore this construction eliminates the need for mounting a measuring instrument on the golfer whose swing is to be diagnosed by measuring her/his swing and hence can be used conveniently.

The skin color region in which skin extraction is executed includes an elbow, a face or a wrist of said golfer. A coordinate of a position of each of said elbow, a neck or said wrist of said golfer is obtained as said attention-focused point.

In the above-described construction, the golfer's elbow, neck, and wrist which are exposed when the golfer wears a shirt with half-length sleeve are set as the attention-focused point. Thereby it is possible to obtain the coordinate of the position of the attention-focused point by the skin extraction.

A search range which is a region in which presence of said skin color region is estimated is set in said still image. The skin extraction processing is executed in said search range.

In the above-described construction, in detecting the position of the colored mark, the entire image plane is not examined but only the search range is examined in judging whether the color information of a pixel in the image can be regarded as the same as the color information of the reference color of said colored mark. Therefore even though a still image includes a color approximate to the color of the colored mark in a place disposed not on the golfer's body, the color can be eliminated to thereby prevent an erroneous recognition from being made, and a computing period of time can be shortened. It is preferable to execute differential processing between the background image and pixels in the search range of the still image to eliminate the background image. Thereby even though a color approximate to the color of the colored mark is included in the background image inside the search range, the color can be eliminated to thereby prevent an erroneous recognition from being made.

A contour of said skin color region is extracted, and a predetermined pixel disposed on said contour is specified as a coordinate of a position of said attention-focused point.

That is, the pixel disposed on said contour is set as a candidate of the coordinate of the position of the attention-focused point. Thereby the attention-focused point can be specified easily.

It is preferable to extract a contour of said skin color region, extract a portion of said contour where not less than a predetermined number of pixels having curvatures in a range from −10° to 10° are continuously present as a straight line portion, and specify a coordinate of a position of said attention-focused point by using said straight line portion.

This construction is effective for extracting the coordinate of the position of a joint bent to a low extent. In view of extraction accuracy, it is preferable that the numerical range of the curvature that is used as the reference for judging whether or not an aggregated region of pixels is the straight line portion is set to the range from −5° to 5°.

One or more images each showing a swing posture are selected and extracted as check-point images including an address image, a take-back shaft 8 o'clock image, a take-back shaft 9 o'clock image, a take-back unskillful arm horizontal image, a top image, a downswing unskillful arm horizontal image, a downswing shaft 9 o'clock image, an impact image, a follow-through shaft 3 o'clock image, and a finish image from a large number of still images constituting said color moving image. Coordinates of positions of said attention-focused points are obtained by executing processing of extracting said skin color region in said check-point images.

In the above-described construction, after still images (check-point image) useful for diagnosing the golf swing are selectively extracted from a plurality of the still images, the coordinate of the position of each of the attention-focused points present on the golfer' body is obtained. Therefore it is unnecessary to obtain the coordinate of the position of each of the attention-focused points present on the golfer' body for all frames (still image) of a photographed moving image of the swing. Thus it is possible to reduce the cost required for computation. Further because the above-described construction allows computations to be performed only for the check-point images, the construction contributes to reduction of the erroneous recognition ratio of the attention-focused point. The attention-focused point may also include a golfer's silhouette, a color of a golfer's wear, a golfer's gloves or/and a golfer's skin color. The attention-focused point may be composed of one or more objects selected from among the golfer's silhouette, the color of the golfer's wear, the color of the golfer's gloves, and the golfer's skin color. The golfer's wear and the golfer's gloves mean the wear and the gloves respectively which the golfer has and include buttons or the like originally attached thereto, but do not include marks such as seals bonded thereto when the golf swing is measured. These attention-focused points eliminate the need for attaching marks to the golfer in measuring the golf swing and allow a measuring work to be performed efficiently, thus preventing the golf swing to be erroneously measured.

As apparent from the foregoing description, according to the present invention, after check-point images useful for diagnosing the golf swing are selectively extracted from a plurality of the still images, the coordinate of the position of each of the attention-focused points present on the golfer' body is obtained for only the check-point images. Therefore it is unnecessary to obtain the coordinate of the position of each of the attention-focused points for all frames of the moving image of the swing. Thus it is possible to reduce the cost required for computation and the erroneous recognition ratio of the attention-focused points.

The position of the attention-focused points in each of the check-point images is obtained as follows: The colored marks are attached to the attention-focused points of the golfer's body to recognize the colored marks by specifying a color in an image. Further the attention-focused points are specified based on the contour extracted from the golfer's silhouette obtained by differential processing executed between said check-point image and the background image or based on the curvature of the contour. In addition, the intersection of the straight line portions of the contour is specified as the position of the attention-focused point. Furthermore the attention-focused point is specified by using edge extraction. In this manner, the image processing allows automatic grasping of the motion of the attention-focused points present on the golfer's body.

By extracting the skin color region of the golfer's body, it is possible to obtain the coordinate of the position of the attention-focused point present on the golfer' body in the still image. Therefore the golf swing-measuring system eliminates the need for mounting a measuring instrument on the golfer whose swing is to be diagnosed by measuring her/his swing and hence can be used conveniently.

BRIEF DESCRIPTION OF THE DRAWINGS

FIG. 25 is a flowchart showing the procedure of extracting the attention-focused point in a take-back left arm horizontal image.

FIG. 28 shows extraction of a left shoulder, in which

DETAILED DESCRIPTION OF THE PREFERRED EMBODIMENTS

The embodiments of the present invention will be described below with reference to drawings.

Figure 2:
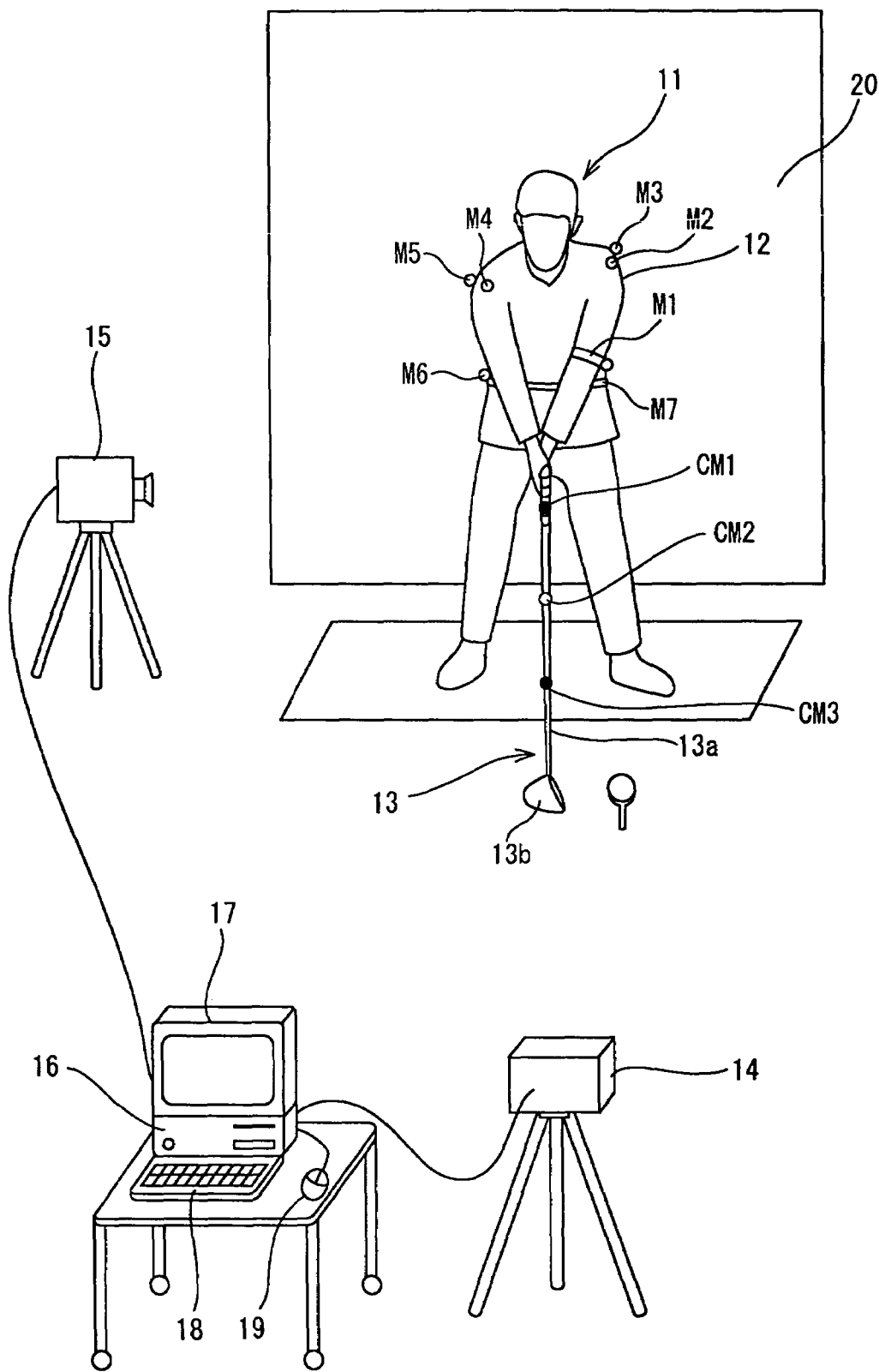
FIG. 2 shows the construction of a golf swing-measuring system of the embodiment of the present invention.

FIG. 2 shows a schematic view of the golf swing-measuring system. The golf swing-measuring system has a computer 16 serving as an information-processing apparatus; a monitor 17 serving as a display means connected to the computer 16; a key board 18 and a mouse 19, serving as input means, connected to the computer 16; and color CCD cameras 14 and 15, connected to the computer 16, installed at a position forward from a golfer 11 and at a position rearward (in side view) from the golfer 11 in a ball fly line respectively.

A golfer 11 (right-handed) who is a person to be diagnosed wears clothes 12 on private clothes. Colored marks M1 through M7 are attached to attention-focused points (joints) of the golfer 11. The clothes 12 for measuring a swing are white. A yellow colored mark M1 is attached to a left elbow. A red colored mark M2 and a blue colored mark M3 are attached to a left shoulder. A blue colored mark M4 and a red colored mark M5 are attached to the right shoulder. A blue colored mark M6 is attached to the right shoulder. A red colored mark M7 is attached to the waist. The colored mark M1 at the left elbow is armband-shaped. The colored mark M7 at the waist is belt-shaped. The other colored marks M2 through M6 are button-shaped (spherical).

Three colored marks CM1, CM2, and CM3 are mounted at regular intervals on a shaft 13a of the golf club 13 gripped by the golfer 11. The colored marks CM1, CM2, and CM3 are mounted on the shaft 13a at regular intervals from a grip side to a head side. The colored mark CM1 nearest to the grip is yellow. The colored mark CM2 disposed between the colored marks CM1 and CM3 is pink. The colored mark CM3 disposed nearest to the head 13b is yellow. That is, the adjacent color marks have different colors. In this embodiment, the distance between the colored marks CM1 and CM2 and the distance between the colored marks CM2 and CM3 are set to 250 mm respectively. The distance between the grip end and the colored mark CM1 is set to 250 mm.

The computer 16 synchronizes the photographing timing of the color CCD cameras 14 and 15 with each other. When a high-speed digital CCD camera is used, it has not less than 30 frames and favorably not less than 60 frames per second. The shutter speed thereof is set to not more than $1/500$s and favorably not more than $1/1000$s.

It is necessary to set the brightness of a space (3 m (length)×3 m (width)×2 m (height)) in which a golfer's swing is photographed to a possible highest lux. If an extremely bright portion is generated in the space, there is a possibility that halation is generated. Therefore as the brightness of the environment in which the golfer swings, it is preferable to set a uniform brightness in the range of not more than 3000 luces. It is preferable that a background 20 of the space in which the swing is photographed has a color different from the color of the clothes of the golfer 11, those of the color marks M1 through M7, and those of the colored marks CM1 through CM3 so that the color marks M1 through M7 and the colored marks CM1 through CM3 can be extracted easily.

The computer 16 is online with the color CCD cameras 14, 15 through a LAN cable, an IEEE1394 or a Camera Link Standard. A moving image (a plurality of still images) of the swing photographed by the color CCD cameras 14, 15 is stored in the hard disk of the computer 16, a memory of the computer 16 or the memory of the board thereof. As will be described later, the computer 16 has a program having a means for executing binarizing processing for each pixel of a plurality of the still images by using a specific threshold of color information and recognizing pixels, of the still images, which satisfy the threshold as a position of each of the colored marks CM1 through CM3 so as to obtain coordinate data of each of the colored marks CM1 through CM3; a means for recognizing the movement of the shaft 13a, based on the coordinate data of the colored marks CM1 through CM3; a means for recognizing the movement of the golfer's arm, and an image extraction means for selectively extracting the still images necessary for measuring the golf swing, based on movement data of the shaft 13a.

Figure 1:
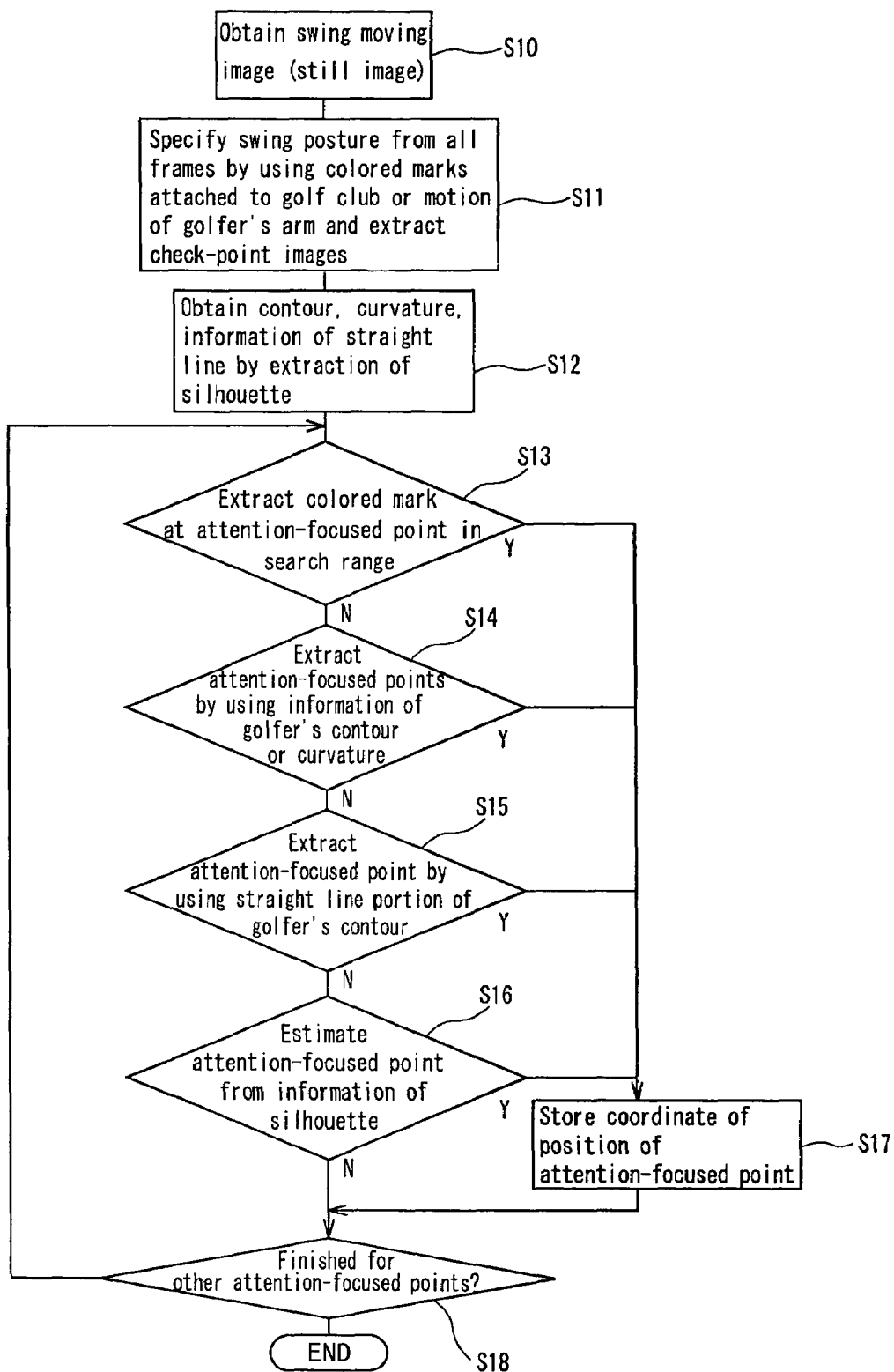
FIG. 1 is a flowchart schematically showing a golf swing-measuring method of a first embodiment of the present invention.

The coordinates of the positions of the attention-focused points present on the golfer' body 11 are obtained based on the flowchart of FIG. 1.

Initially, a background image in which only the background 20 is photographed by the color CCD cameras 14, 15 is read. A still image for each frame of the swing moving image is captured into the computer 16 through the color CCD cameras 14, 15. The data of each of the obtained still images is stored in the hard disk, the memory in the computer 16 or the memory of the board (step S10).

Thereafter the following check-point images useful for diagnosing the swing are automatically extracted from a large number of the still images constituting the moving image of the swing: an address image, a take-back shaft 8 o'clock image, a take-back shaft 9 o'clock image, a take-back left arm horizontal image, a top image, a downswing left arm horizontal image, a downswing shaft 9 o'clock image, an image previous to an impact image, the impact image, an image subsequent to the impact image, a follow-through shaft 3 o'clock image, and a finish image (step S11).

As described above, the check-point images are automatically extracted from a large number of the still images constituting the moving image of the swing. Thus this method has an advantage that computations are performed only for the above-described check-point images in extracting the coordinates of the positions of the attention-focused points present on the golfer' body 11 by using the colored marks M1 through M7, the contour processing, and the like which are executed in a subsequent step.

The method of automatically extracting each check-point image is described below.

Address Image

Initially, the method of extracting the address image is described below. The address image means a still image in the state in which the golfer 11 takes an address posture.

When photographing of the moving image of the swing starts from the address state, an initial image is set as the address image. When a sound generated at the impact time and a signal outputted from an impact sensor are obtained as a trigger signal and when the moving image in a predetermined period of time before and after the impact time is obtained, the initial image is not necessarily the address image. This is because the initial image includes the image of a waggle (operation of swinging golf club head as a preparatory operation before addressing ball). Thus in this case, differential processing is executed between frames (still images). A frame having a minimum differential is regarded as the state in which the golfer 11 is stationary and regarded as the address image.

Thereafter the method of extracting the take-back shaft 9 o'clock image, the top image, the downswing shaft 9 o'clock image, the image previous to impact image, the impact image, the image subsequent to impact image, the follow-through shaft 3 o'clock image, and the finish image is described below.

The take-back shaft 9 o'clock image means a still image which is placed at a nine o'clock position at a take-back time, when the shaft is regarded as the needle of a clock. The top image is a still image placed at a top position at which the swing shifts from a take-back to a downswing. The downswing shaft 9 o'clock image means a still image placed at the nine o'clock position in the downswing, when the shaft is regarded as the needle of the clock. The image previous to impact image means a still image in a state immediately before the golf club head impacts the ball. The impact image means a still image at the time when the golf club head collides with the ball. The image subsequent to impact image means a still image in a state immediately after the golf club head impacts the ball. The follow-through shaft 3 o'clock image means a still image placed at the three o'clock position at a follow-through time when the shaft is regarded as the needle of the clock. The finish image means a still image when the swing has finished and the golf club stops moving.

Basically, the swing posture shown on each check-point image is judged by tracing the coordinates of the colored marks CM1 through CM3 of each frame. Thus initially, the method of automatically tracing the colored marks CM1 through CM3 is described below.

Figure 3:
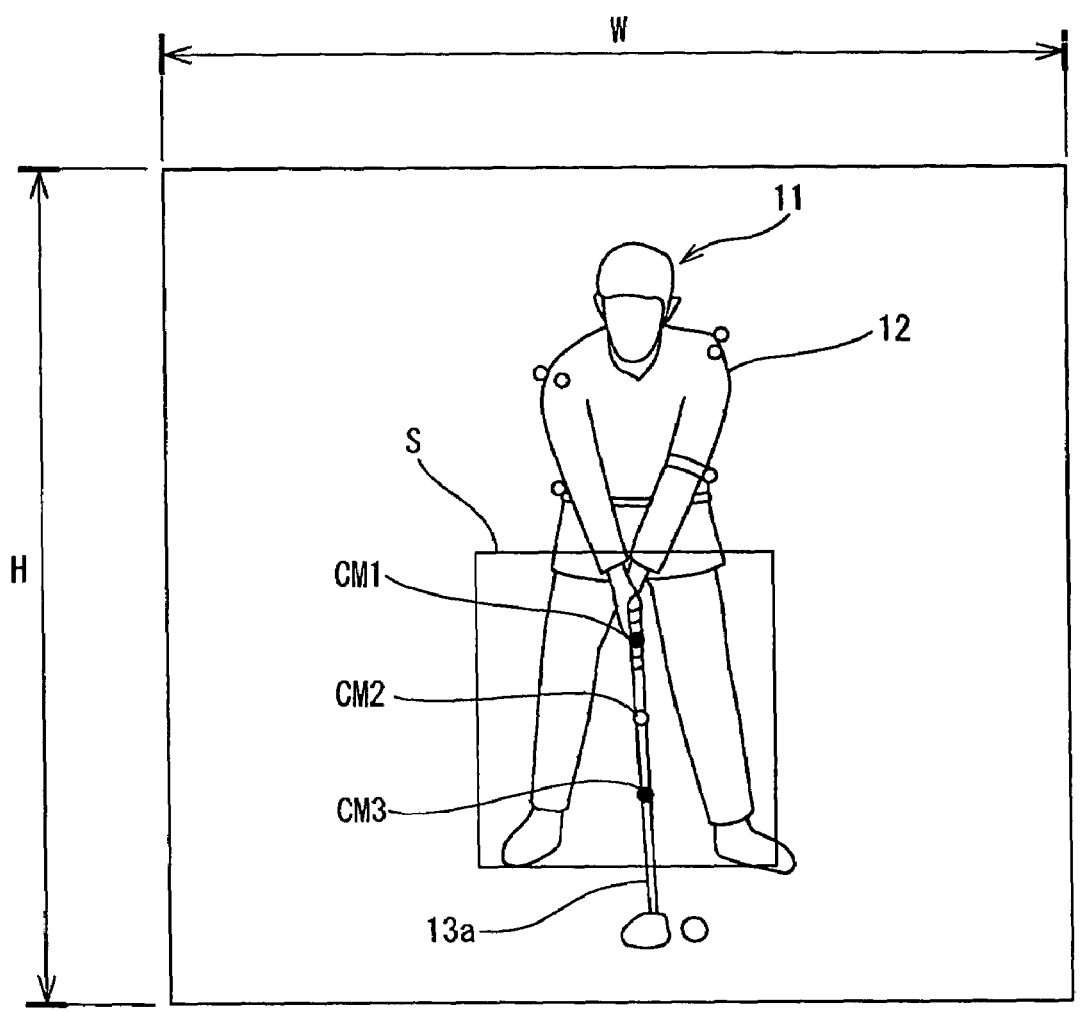
FIG. 3 is an explanatory view for explaining extraction of colored marks in an address image.

Binarizing processing for automatically recognizing the colored marks CM1 through CM3 is executed in the address image. The binarizing processing is executed for the entire frame in this embodiment. But the binarizing processing may be executed for only a region S in which the shaft 13a is considered present, when the region to be photographed is so limited that the golfer 11 is photographed in the vicinity of the center of the image, as shown in FIG. 3. Supposing that the width of the image is W and that the height thereof is H, the range of W/3 to 2 W/3 is set as the width of the region S, and the range of H/2 to 4 H/5 is set as the height of the region S.

As the method of executing the binarizing processing, the value of R, G, and B or Y, I, and Q may be used. In this embodiment, hue, saturation, lightness which allow the color of the colored marks CM1 through CM3 to be recognized to the highest extent are utilized. The binarizing processing is executed as follows: Initially, the value of R, G, and B of each pixel on the frame is obtained.

$$T = R + G + B \qquad \text{Equation 1}$$

Normalization of an equation 2 shown below is performed by using a stimulus sum T determined by the equation (1).

$$r = \frac{R}{T}, g = \frac{G}{T}, b = \frac{B}{T} \qquad \text{Equation 2}$$

When the color is expressed in 24 bits, the value of R, G, and B is in the range of 0 to 255.

The hue θ is computed by using equations 3 and 4 shown below.

$$\theta_1 = \cos^{-1} \frac{2r - g - b}{\sqrt{6[(r - 1/3)^2 + (g - 1/3)^2 + (b - 1/3)^2]}} \qquad \text{Equation 3}$$

Because $0 \leq \theta_1 \leq \pi$, the equation 4 is as shown below:

$$\theta = \begin{cases} \theta_1 & g \geq b \\ 2\pi - \theta_1 & g < b \end{cases} \qquad \text{Equation 4}$$

The saturation S is computed by using an equation 5 shown below.

$$S = 1 - 3 \min(r, g, b) \qquad \text{Equation 5}$$

The lightness V is computed by using an equation 6 shown below.

$$U = \frac{R + G + B}{3} \qquad \text{Equation 6}$$

When the value of the hue, saturation, lightness of a pixel (color information of pixel) obtained by using the equations 3 through 6 does not satisfy a predetermined condition (reference color information), the pixel is set to 0. When the value of the hue, saturation, lightness of a pixel satisfies the predetermined condition, the pixel is regarded as having the same color as that of the colored marks CM1 through CM3 and set to 1, and labeling processing of pixels set to 1 is executed sequentially.

As the predetermined condition of the hue, the saturation, and the lightness, a threshold having the hue θ=30° to 60°, the saturation S≧0.5, and the lightness V≧100 is set for the yellow colored marks CM1 and CM3. A threshold having the hue θ=320° to 360° or 0° to 10°, the saturation S=0.3 to 0.6, and the lightness V≧80 is set for the pink colored mark CM2. In this manner, pixels satisfying these predetermined conditions are regarded as having the same color as that of the colored marks.

There is actually only one pink colored mark CM2. When an unrelevant pink color is present in the image, there is a fear that two or more regions are extracted. In consideration of such a case, the area range of the colored mark CM2 is set in advance. A region having an area larger than the set area range is judged as not the colored mark CM2, whereas a region having an area smaller than the set area range is recognized as the colored mark CM2. In this embodiment, the area range recognized as that of the colored marks CM1 through CM3 is 5 to 60 pixels or 5 to 200 pixels.

When pixels recognized as the colored marks CM1 through CM3 in the above-described manner are set to 1, 2, and 3 respectively by labeling the colored marks CM1 through CM3, the color information of the colored marks and the coordinate of the center of gravity thereof are obtained from the pixels set to the respective numerical values. The color information of the colored mark means the information including an average color of pixels in the region, maximum and minimum values of the R, G, and B of each pixel, and the fluctuation width thereof.

By executing the above-described processing, it is possible to automatically and precisely extract the colored marks CM1 through CM3 attached to the shaft 13a of the golf club 13.

Processing of automatically tracing the colored marks CM1 through CM3 extracted automatically in the address image is executed for second and third images after the address image is obtained.

Figure 4:
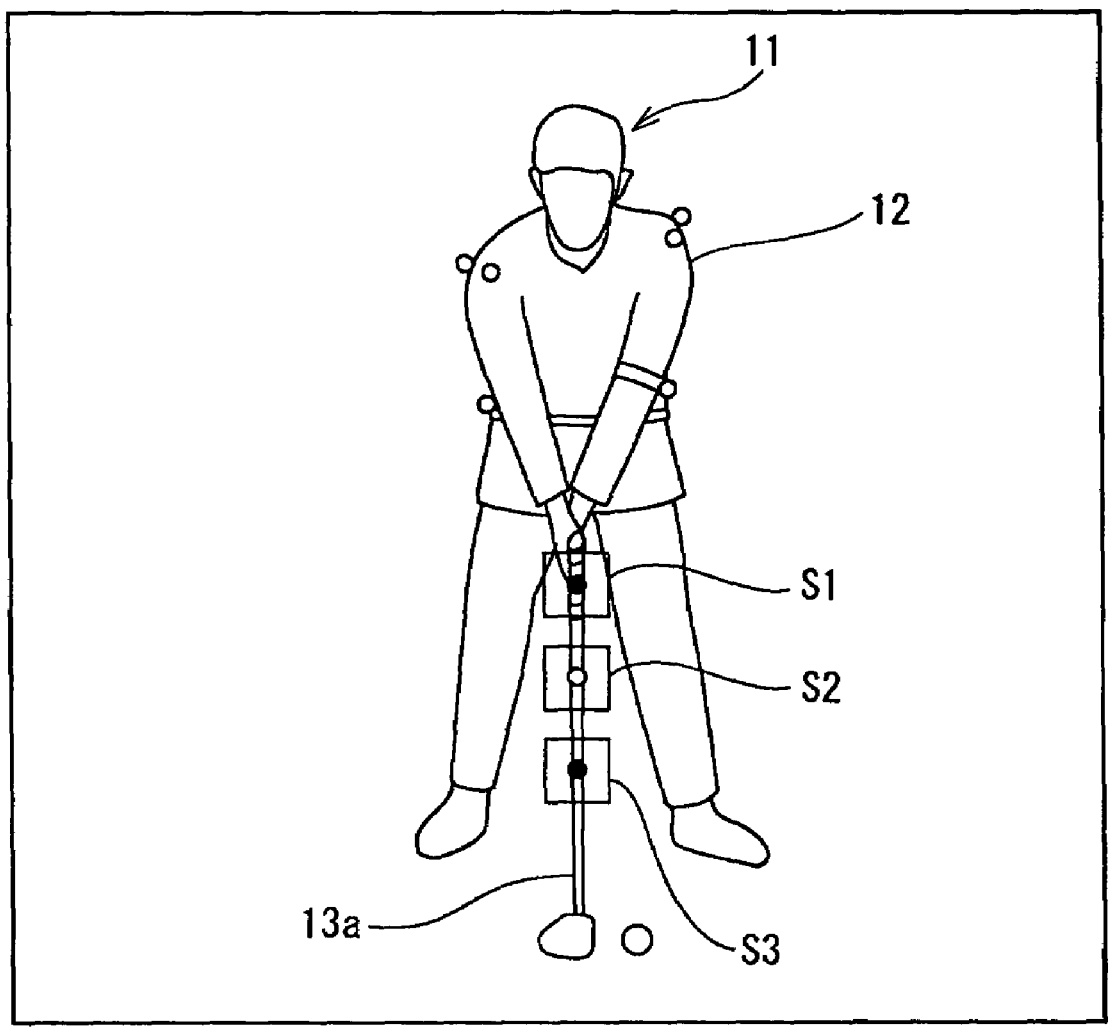
FIG. 4 is an explanatory view for explaining extraction of the colored marks in second and third images subsequent to the address image.

As shown in FIG. 4, square search ranges S1 through S3 are set on the colored marks CM1 through CM3 respectively, with the colored marks CM1 through CM3 disposed at the center thereof. The search ranges S1 through S3 mean the range of the image in which computations are performed to execute processing of detecting the colored marks CM1 through CM3. By introducing the concept of the search ranges S1 through S3, the processing of detecting the colored marks CM1 through CM3 is executed only within the search ranges S1 through S3, even if there is a portion having a color proximate to that of the colored marks CM1 through CM3 outside the search ranges S1 through S3. Therefore it is possible to prevent the portion from being erroneously recognized as the colored marks CM1 through CM3. It is also possible to make a computing period of time much shorter than that required in the case where binarizing processing is performed for all pixels. In this embodiment, in the search ranges S1 through S3, by default, a length X breadth (YX) range is set to 10×10 pixels with the colored marks CM1 through CM3 disposed at the center of the search ranges S1 through S3 respectively. The direction facing toward the right on the image is the positive direction of the X-coordinate. The direction looking downward on the image is the positive direction of the Y-coordinate. The shaft 13a hardly moves in the second image and the third image after the address image is obtained. Thus the search ranges S1 through S3 during the automatic tracing operation is determined by setting the colored marks CM1 through CM3 automatically recognized in the image one unit time previous to the current time as the central position of the search ranges S1 through S3 respectively.

Thereafter the color range is set.

The color range means an error-allowable range in which the color information of pixels of the image to be processed is the same as that of the colored marks CM1 through CM3 in recognizing the colored marks CM1 through CM3. In this embodiment, the numerical range of the half of the difference between a maximum width and a minimum width is set as the color range in which an average value of each of R (red), G (green), and B (blue) which are the color information of the colored marks CM1 through CM3 obtained in the address image is disposed at the center of the color range.

The automatic tracing processing to be described below is executed by tracing the colored marks CM1 through CM3 sequentially from the colored mark CM1, disposed nearest the grip, which moves at a speed lower than the other colored marks CM2 and CM3 during the swing to the colored mark CM2 and then to the colored mark CM3.

It is judged whether or not each of the R, G, and B of the differential pixel inside the search range S1 falls in the above-described color range. Pixels falling in the color range are regarded as the pixels indicating the colored mark M1, and the position of the center of gravity of the group of the extracted pixels is obtained. If this method of using the color range is incapable of tracing the colored marks, a color extraction may be performed to trace them by utilizing the color information (hue, saturation, lightness). These processing is executed for each of the search ranges S1 through S3 of the colored marks M1 through M3.

If a plurality of mark candidate regions is extracted inside the search range, differential processing is executed between the colored mark M1 and the background image in the search range S1. Thereby the background image is removed from the search range S1. Thus even though a color proximate to that of the colored mark M1 is present in the background image, the color is not erroneously recognized as that of the colored mark M1 in subsequent steps of recognizing the colored mark M1.

Description is made on the method of setting the central position of the search ranges S1 through S3 of the colored marks CM1 through CM3 in frames subsequent to the fourth frame with respect to the address image. In the case of the colored mark CM1 nearest the grip, a movement vector amount V1 between a first frame (address) and a second frame and a movement vector amount V2 between the second frame and a third frame are computed. In consideration of an increase amount V2−V1, a movement vector amount {V2+(V2−V1)} between the third frame and the fourth frame is estimated. A position to which the colored mark M1 is offset by the movement vector amount {V2+(V2−V1)} from the central position of the search range S1 at one unit time previous to the current time is set as the center of the search range S2 of the current-time image (fourth frame). The method of setting the central position of each of the search ranges S1 through S3 of the colored marks CM1 through CM3 in the fifth frame and those subsequent to the fifth frame is carried out similarly.

The method of setting the central position of each of the search ranges S2 and S3 of the colored marks CM2 and CM3 in the fourth frame is executed as follows: The colored marks CM2 and CM3 are offset from the central position of each of the search ranges S2 and S3 at one unit time previous to the current time by the movement vector amount {V2+(V2−V1)} obtained by utilizing the colored mark CM1 whose position has been decided. A shaft angle D1 between the first frame and the second frame and a shaft angle D2 between the second frame and third frame are computed. In consideration of an increase amount D2−D1, a shaft angle {D2+(D2−D1)} between the third frame and the fourth frame is estimated. Each of the colored marks CM2 and CM3 is rotated on the colored mark CM1 of the fourth frame by the shaft angle {D2+(D2−D1)}. The method of setting the central position of each of the search ranges S2 and S3 of the colored marks CM2 and CM3 in the fifth frame and those subsequent to the fifth frame is executed similarly.

Figure 5:
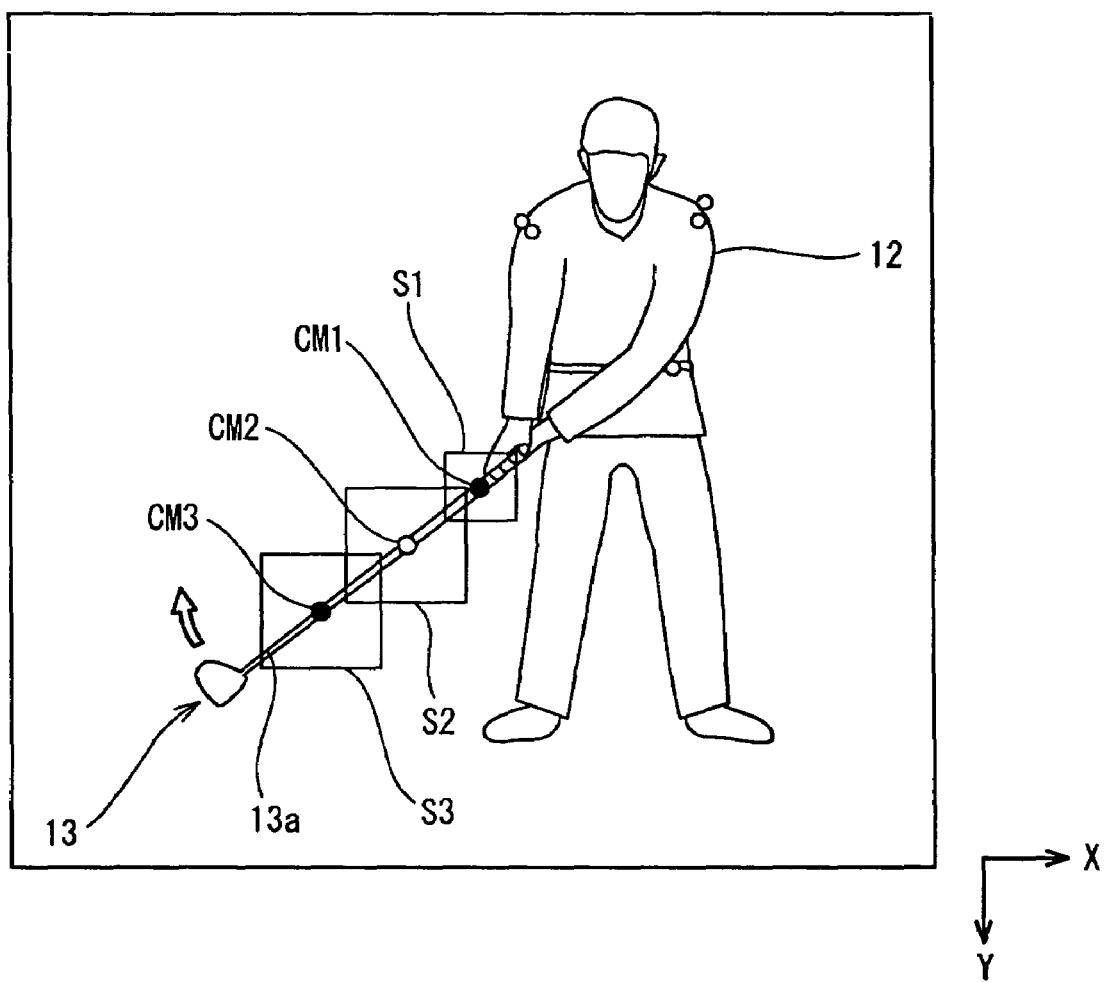
FIG. 5 is an explanatory view for explaining automatic tracing of the colored marks.

By deciding the central position of each of the search ranges S2 and S3 in combination of the offset movement and the rotation movement, it is possible to estimate the position of the shaft 13a considerably accurately, even when the shaft 13a moves fast in a downswing. Thus it is unnecessary to increase the area of the search ranges S2 and S3 while the positions of the colored marks CM1 through CM3 are being traced. As shown in FIG. 5, the area of each of the search ranges S2 and S3 is set to 20×20 pixels.

If a plurality of colored mark candidate regions is extracted in the search range, differential processing is executed between the image of the colored mark M1 and the background image inside the search range S1. Thereby the background image is removed from the search range S1. Thus even though a color proximate to that of the colored mark M1 is present in the background image, the color is not erroneously recognized as that of the colored mark M1 in subsequent steps.

When the positions of the colored marks CM1 through CM3 cannot be traced by the above-described method, binarizing processing is executed again by executing a method similar to the method by which the colored marks CM1 through CM3 are automatically extracted in the address image. That is, as the main conceivable reason the colored marks CM1 through CM3 cannot be found in the color range determined in the address image, the colored marks CM1 through CM3 present in a range darker than the address image is traced. Thus alteration of reducing the threshold of the saturation and lightness of the colored marks CM1 through CM3 is made to execute the binarizing processing again.

When the positions of the colored marks CM1 through CM3 cannot be still traced and when two of the three colored marks CM1 through CM3 can be recognized, the position of the remaining one mark is computed from the positional relationship between the two colored marks. Alternatively, the center of the search range in which the colored mark is offset by the above-described method may be regarded as the position thereof at the current time.

The coordinate data of the positions of all the colored marks CM1 through CM3 during the golfer's swing motion from the address till the finish can be obtained in the above-described manner.

The following check-point images are extracted in dependence on the coordinate data of the colored marks CM1 through CM3 obtained during the swing.

Take-back 9 O'clock Shaft Image

The angle of the shaft 13a is computed by using two of the colored marks CM1 through CM3 and by selecting an image in which the shaft 13a is nearest a horizontal direction (90°). Thereby the take-back shaft 9 o'clock image is extracted. Alternatively, when one of the colored marks CM1 through CM3 is used, the take-back shaft 9 o'clock image may be extracted by selecting an image in which an X-direction component of the movement vector of the colored mark is minimum. It is to be noted that the state in which the shaft 13a is 6 o'clock is 0° in its angle and that the clockwise direction is positive.

Top Image

The angle of the shaft 13a is computed by using two of the colored marks CM1 through CM3 and by selecting an image in which the shaft 13a has a largest angle. Thereby the top image is extracted. Alternatively, when one of the colored marks CM1 through CM3 is used, the take-back shaft 9 o'clock image may be extracted by selecting an image in which X-direction and Y-direction components of the movement vector of the colored mark are minimum respectively.

Downswing 9 O'clock Shaft Image

The angle of the shaft 13a is computed by using two of the colored marks CM1 through CM3 and by selecting an image in which the shaft 13a is nearest the horizontal direction (90°) and which is subsequent to the top image in time. Thereby the downswing shaft 9 o'clock image is extracted. When one of the colored marks CM1 through CM3 is used, the downswing shaft 9 o'clock image is extracted by selecting an image in which the X-direction component of the movement vector of the colored mark is minimum and which is subsequent to the top image in time.

Impact Image

The angle of the shaft 13a is computed by using two of the colored marks CM1 through CM3 and by selecting an image in which the shaft 13a has an angle nearest 0°. Thereby the impact image is extracted. Alternatively, when one of the colored marks CM1 through CM3 is used, the impact image may be extracted by selecting an image in which the Y-direction component of the movement vector of the colored mark is minimum. The impact image may be also extracted by using an external trigger signal. The impact image may be also extracted by utilizing a sound generated when a ball impacts the head of the shaft.

Image Previous to Impact Image

The image previous to the impact image is extracted by selecting an image obtained by rewinding frames for a predetermined period of time (or predetermined number of frames) with respect to the time when the impact image is extracted.

Image Subsequent to Impact Image

The image subsequent to the impact image is extracted by selecting an image obtained by advancing frames for a predetermined period of time (or predetermined number of frames) with respect to the time when the impact image is extracted.

Follow-through Shaft 3 O'clock Image

The angle of the shaft 13a is computed by using two of the colored marks CM1 through CM3 and by selecting an image in which the shaft 13a has an angle nearest −90°. Thereby the follow-through shaft 3 o'clock image is extracted. When one of the colored marks CM1 through CM3 is used, the follow-through shaft 3 o'clock image is extracted by selecting an image in which the X-direction component of the movement vector of the colored mark is minimum and which is subsequent to the impact image.

Finish Image

The angle of the shaft 13a is computed by using two of the colored marks CM1 through CM3 and by selecting an image in which the angle of the shaft 13a is smallest. Thereby the finish image is extracted. When one of the colored marks CM1 through CM3 is used, the finish image is extracted by selecting an image in which the X-direction and Y-direction components of the movement vector of the colored mark are minimum and which is subsequent to the top image in time.

The method of extracting the take-back left arm horizontal image and the downswing left arm horizontal image are described below.

The take-back left arm horizontal image is a still image in which the golfer's left forearm is horizontal at the take-back time. The downswing left arm horizontal image is a still image in which the golfer's left forearm is horizontal at the downswing time.

To recognize the image in which the golfer's left arm is horizontal, a template having an image region including the left arm is formed and template matching processing is executed to set an image in which the angle of a matched template is horizontal as the take-back left arm horizontal image.

The golfer's contour is extracted to generate the template including the left arm in the still image, as described below.

Initially, an image in which the shaft 13*a* is in the 6 o'clock state determined in dependence on the angle of the shaft 13*a* obtained from the coordinate of the colored marks CM1 through CM3 is extracted. A vector between the colored mark CM1 nearest the grip and the colored mark CM2 adjacent to the colored mark CM1 is computed to decide the position of the grip. More specifically, the position of the grip is computed by the following equation:

(Grip position)=(position of colored mark CM1)−α× (vector between colored marks)

where α is the ratio of the distance between the colored mark CM1 and the grip to the distance between the colored marks CM1 and mark CM2. In this embodiment, α is 0.5.

Thereafter differential processing is executed between the background image (image in which the golfer 11 is not photographed) and the 6 o'clock shaft image to extract a golfer's silhouette. More specifically, let it be supposed that the value of the R, G, and B in the background image is r', g', and b' respectively and that the value of the R, G, and B of the pixel of the 6 o'clock shaft image is r, g, and b respectively. When the norm (square root of sum of squares of absolute values of difference between r of pixel of one image and r' of pixel of the other image, difference between g of pixel of one image and g' of pixel of the other image, and difference between b of pixel of one image and b' of pixel of the other image) shown by an equation 7 below is less than a predetermined threshold, binarizing processing of regarding the silhouette as not the golfer's silhouette and setting the pixels to 0 is executed. On the other hand, when the norm is not less than the predetermined threshold, binarizing processing of regarding the silhouette as the golfer's silhouette and setting the pixels to 1 is executed. Labeling of the pixels set to 1 are executed sequentially. In this embodiment, the threshold of the norm is set to 40. Differential processing may be executed between the background image and the 6 o'clock shaft image by using the hue, the saturation, the lightness. In this case, of labeling regions regarded as the golfer's silhouette, one or two regions of not less than 5000 or not less than 10000 are regarded as the golfer's silhouette.

$$\sqrt{(r-r')^2+(g-g')^2+(b-b')^2} \qquad \text{Equation 7}$$

Figure 6A:
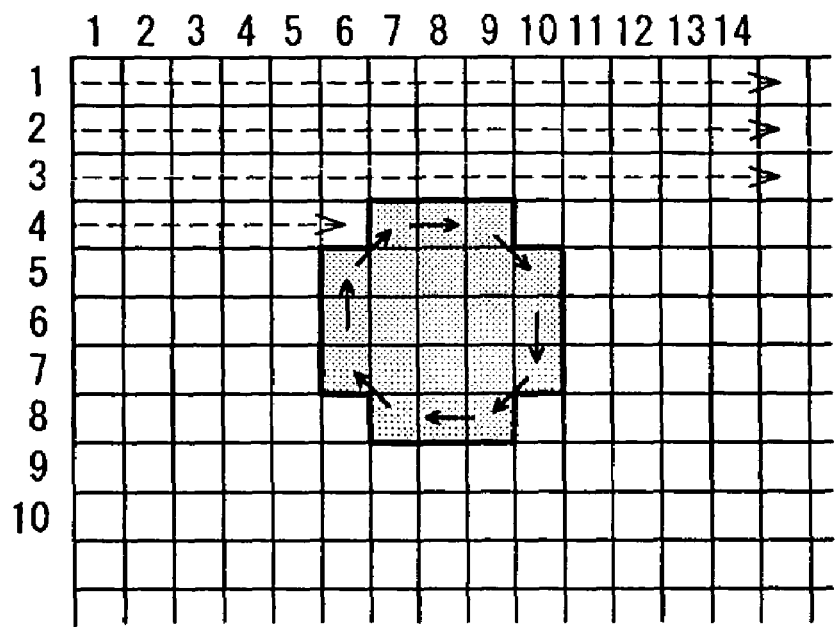
FIGS. 6A and 6B are explanatory views for explaining extraction of the contour of golfer.
Figure 6B:
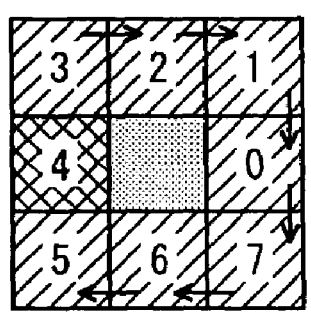

As shown in FIG. 6A, scanning processing is executed for the binarized image to execute extraction of the golfer's contour from portions corresponding to pixels of 1 or 2. In the contour extraction method, scanning processing is executed for the labeled image toward the right-hand direction and from top to bottom by using the pixel at the upper left of the frame as the starting point to search pixels of 1 or 2. More specifically, a pixel (4, 7) is initially found by the scanning processing. Thereafter as shown in FIG. 6B, seven pixels other than a pixel immediately before the pixel (4, 7) are examined clockwise from the upper left pixel. A pixel having the same label as that of the pixel (1 or 2) found initially is set as the next boundary. This processing is executed sequentially. The contour extraction terminates when the boundary returns to the pixel (4, 7). Noise remains in the as-extracted contour. Thus smoothing is executed by circularly executing movement average processing on the entire contour.

The movement average processing is executed by using an equation 8 shown below:

$$\text{bnd\_pt\_ido}(n) = \frac{1}{2k+1}\left\{\sum_{i=n-k}^{n+k} \text{bnd\_pt}(i)\right\}$$

where bnd_pt(n) is the coordinate of an n-th contour, k is the number of pixels utilized for calculations before and after the movement average processing is executed, and bnd_pt_ido(n) is the coordinate of the contour after the movement average processing is executed.

Let it be supposed that when the golfer's contour is present from a first pixel through a bnd_num-th pixel (last of contour number), a pixel for which the movement average processing is executed is an n-th pixel. When n<k, the movement average processing is executed by utilizing a bnd_num-(k-n)th pixel through a bnd_num-th pixel disposed near the last contour number. When bnd_num-n<k, the movement average processing is executed by utilizing a first pixel through a k-(bnd_num-n)th pixel disposed near the first contour number.

Figure 7:
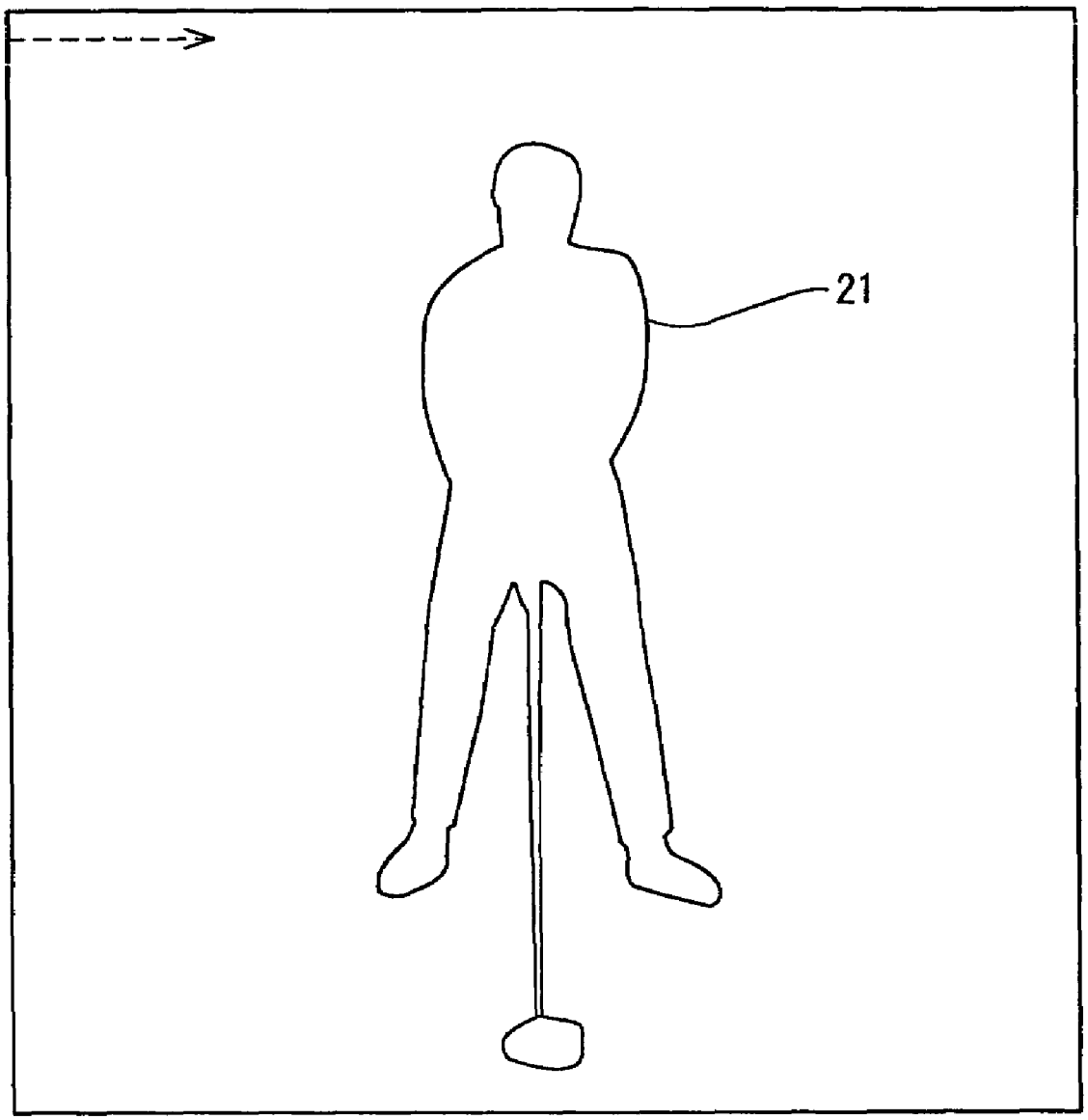
FIG. 7 shows an image in which the golfer's contour has been extracted.

The curvature of the contour is computed from the contour data obtained by the smoothing to obtain the position of the golfer's left shoulder. That is, a portion having a large curvature which appears first is recognized as the golfer's head in scanning an image including the contour data as shown in FIG. 7. A portion having a small curvature which appears thereafter is recognized as the golfer's neck. A portion having a large curvature which appears thereafter is recognized as the golfer's shoulder. In consideration of creases of the golfer's clothes, the curvature of each of pixels of ±5 is computed. The average value of the curvatures should be set as the curvature of the central pixel.

The method of computing the curvature of the contour is described below.

Supposing that the length of a circular arc of a contour to be extracted is S and that the angle thereof is θ, the curvature C is expressed by an equation 9 shown below.

$$C = \frac{d\theta}{dS} \qquad \text{Equation 9}$$

When computations are performed for only a pixel whose curvature is to be found and for points adjacent to the pixel, a correct value cannot be obtained because an obtained value has a large variation. Thus including a row consisting of dots, whose number is k, disposed at both sides of the pixel whose curvature is to be found, the curvature is computed by using an equation 10 shown below:

$$C = \frac{1}{k}\left\{\sum_{i=k+1}^{0}\tan^{-1}\left(\frac{y_{i-1}-y_i}{x_{i-1}-x_i}\right) - \sum_{i=0}^{k-1}\tan^{-1}\left(\frac{y_i-y_{i+1}}{x_i-x_{i+1}}\right)\right\} \qquad \text{Equation 10}$$

Figure 9:
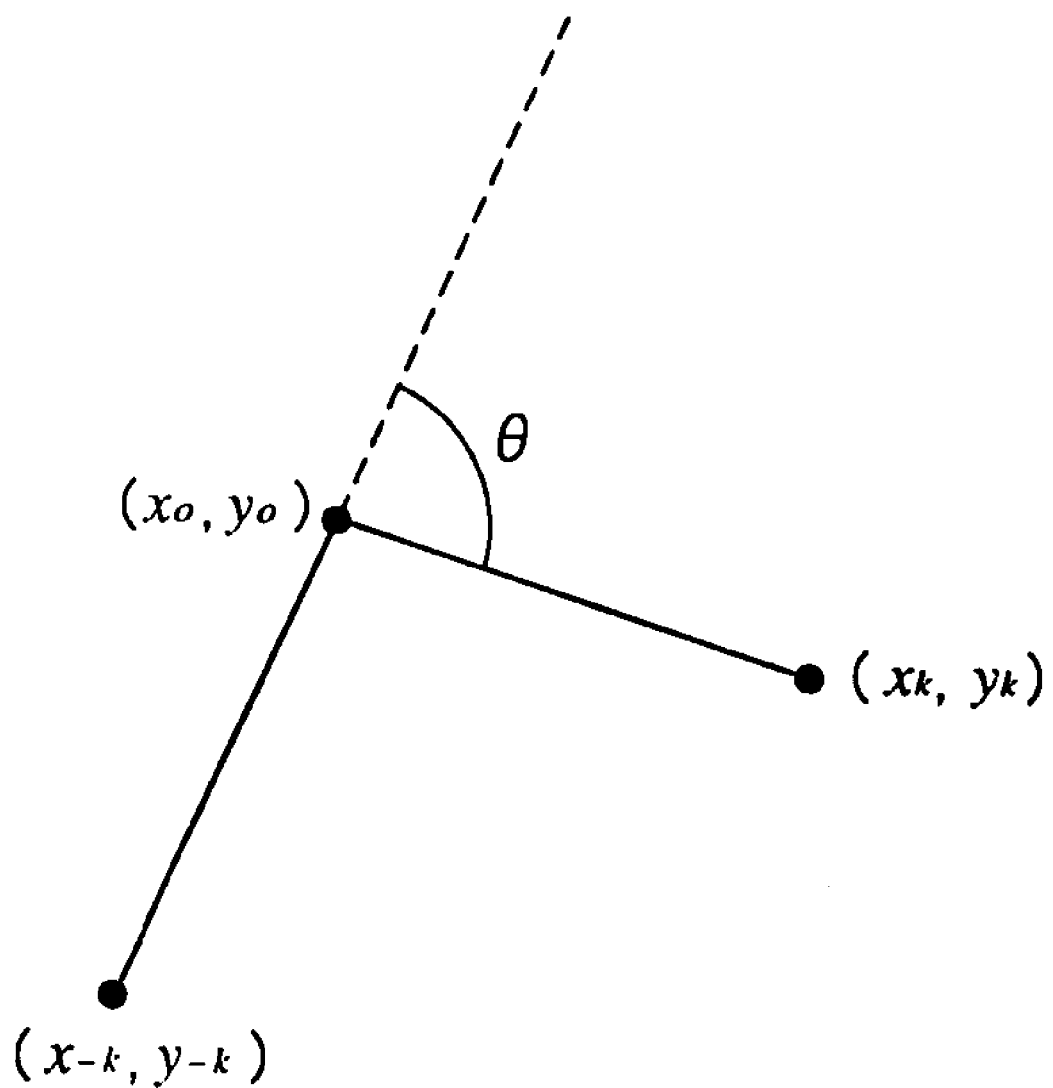
FIG. 9 is an explanatory view for explaining computation of a curvature.

In the equation 10, the length S of the circular arc of the contour in the equation 9 is abbreviated to simplify the equation 10. In this embodiment, to further simplify the equation 10, the curvature C is computed in an equation 11 by using both ends of the row of dots, as shown in FIG. 9.

$$C = \tan^{-1}\left(\frac{y_o - y_{-k}}{x_o - x_{-k}}\right) - \tan^{-1}\left(\frac{y_k - y_o}{x_k - x_o}\right) \qquad \text{Equation 11}$$

Take-Back Left Arm Horizontal Image

Figure 8A:
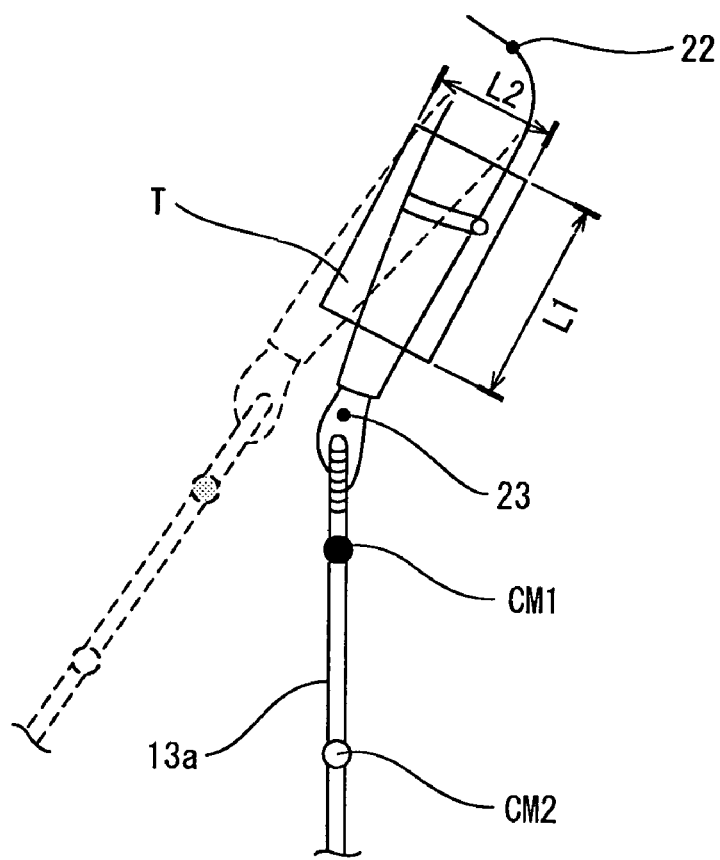
FIGS. 8A and 8B are explanatory views for explaining template matching.

As shown in FIG. 8A, a rectangular template T is set in a region between a left shoulder 22 and a grip 23 both extracted in a manner similar to that described above. The length L1 of the longer side of the template T is set to the half of the length between the shoulder and the grip. The length L2 of the shorter side of the template T is set to such an extent (20 pixels in this embodiment) that the arm is included in the template T.

Figure 8B:
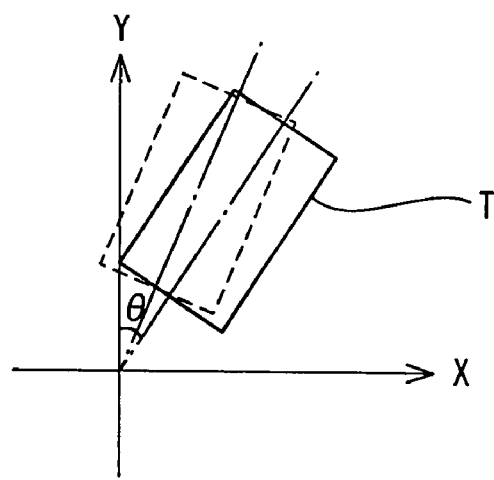

An image at the next time is read to obtain the position of the grip. Thereafter as in the case of the movement vector of the grip position, a parallel movement of the template T of the previous frame is performed. As shown in FIG. 8B, the template T is rotated clockwise on the grip position up to 10° at intervals of 1° to compute the angle of the template T at the time when the template T matches the take-back left arm horizontal image. That is, an image in which the angle of the template T is closest to 90° (horizontal) is regarded as the take-back left arm horizontal image and extracted. Matching processing may be executed by translating the template T in addition to rotating the template.

In the template matching processing, the value of the R, G, and B indicating the color information of pixels inside the template T is converted into a luminance Y for evaluation by using an equation 12 shown below. Although evaluation is made in terms of the luminance Y, the norm (see equation 7) of the R, G, and B may be used for evaluation.

$$Y = 0.299R + 0.587G + 0.114B \quad \text{Equation 12}$$

In the evaluation, the sum of the absolute values of the difference between the values of pixels is used. The sum is shown by an equation 13 shown below:

$$S(p, q, \theta) = \sum_{\theta=0}^{10} \sum_{j=0}^{m-1} \sum_{i=-\frac{n}{2}}^{n/2} |g_t(i_o + i + P, j_o + j + q, \theta + \alpha) - g_{t-1}(i_o + i, j_o + j, \alpha)| \quad \text{Equation 13}$$

where t is a current frame, t−1 is a frame previous by one frame to the current frame, (p, q) is a range in which parallel movement is executed, $(i_o, j_o)$ is the position of the grip, m is the number of pixels at the longer side of the template T, n is the number of pixels at the shorter side of the template, θ is the rotational angle of the template T, α is the angle of the template T found by one frame previous to the current frame, $g_t$ (x, y, θ) is a function indicating the luminance Y (or norm of R, G, B) of a pixel when the angle of the template T is θ at a coordinate (x, y).

The position and angle (p, q, θ) of the template T are changed in the above conditions to compute the length S (p, q, θ) of the circular arc of the contour. The template is regarded as matching the take-back left arm horizontal image to a highest extent at the position and angle making this value minimum. An image in which the value of θ of the position and angle (p, q, θ) is closest to 90° when the template matches the take-back left arm horizontal image is extracted as the take-back left arm horizontal image.

Downswing Left Arm Horizontal Image

The template including the left arm in the take-back left arm horizontal image obtained as described above is utilized to extract an image, subsequent to the top image, which matches the template to a highest extent as the downswing left arm horizontal image.

As apparent from the above description, considering the extraction order of the images of the swing, the downswing left arm horizontal image is extracted after the top image is extracted. Thus the template matching processing may be started from the top image. However, it takes much time to execute the template matching processing from the top image or the entire arm is not necessarily seen in the top image. Thus there is a possibility of an erroneous recognition.

Therefore in the embodiment, the downswing left arm horizontal image is extracted by extracting the downswing shaft 9 o'clock image initially and executing the template matching processing by putting back a clock. Thereby it is possible to shorten a computing period of time and prevent an erroneous recognition.

Take-back Shaft 8 O'clock Image

The method of extracting the take-back shaft 8 o'clock image is described below. The take-back shaft 8 o'clock image means a still image that is placed at an eight o'clock position at the take-back time, when the shaft is regarded as the needle of a clock.

The width (stance width) of the golfer's body is obtained by extracting the golfer's silhouette at the above-described shaft 6 o'clock image. Then an image at the time when a perpendicular passing through the right-hand edge of the right leg and the colored mark M1 intersect with each other is selected as the take-back shaft 8 o'clock image and extracted.

Figure 10:
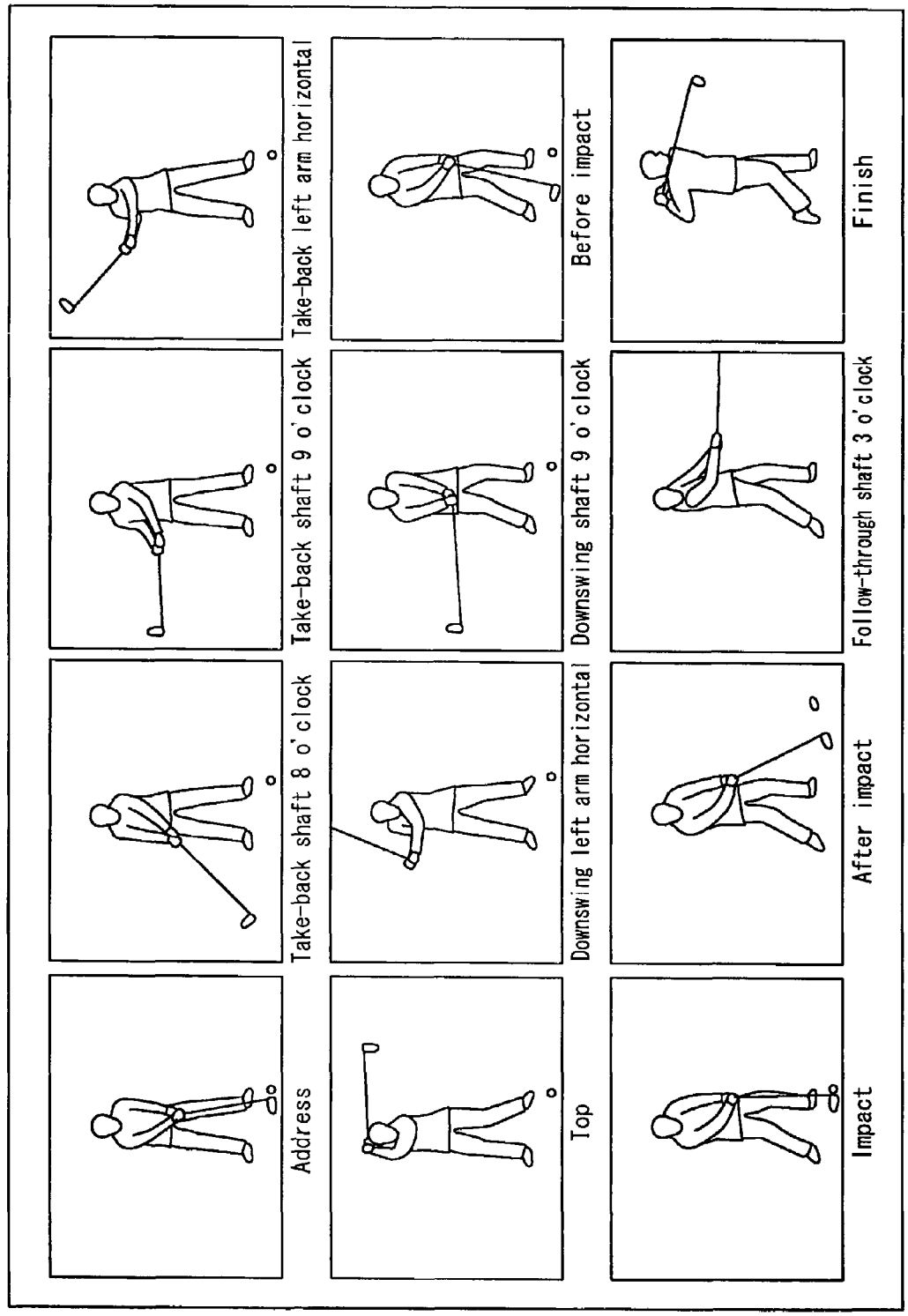
FIG. 10 shows check-point images viewed from a front side.
Figure 11:
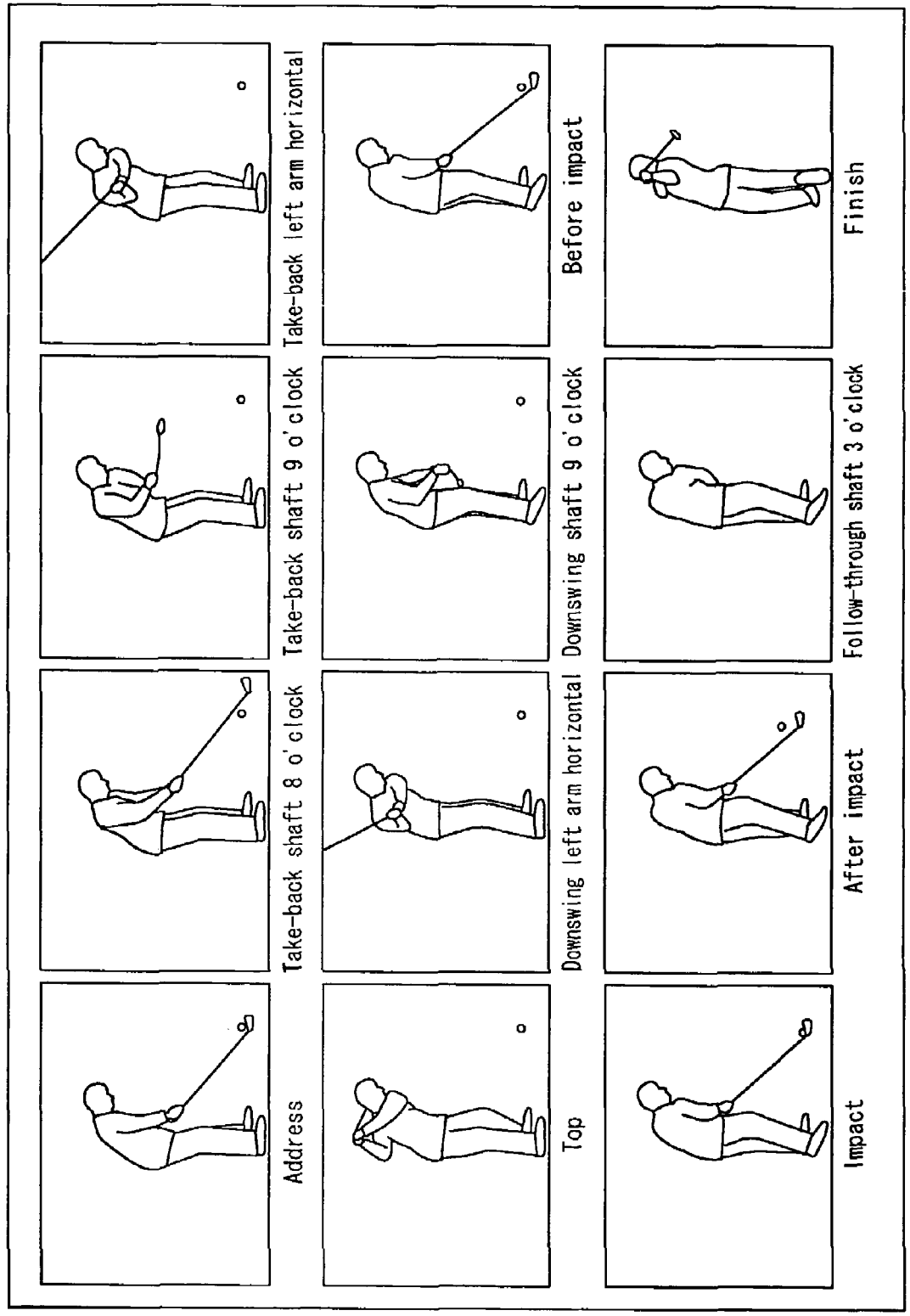
FIG. 11 shows check-point images viewed rearward (in side view) from the golfer in a ball fly line.

In the above-described manner, it is possible to extract the following check-point images shown in a front view in FIG. 10. The check-point images include the address image, the take-back shaft 8 o'clock image, the take-back shaft 9 o'clock image, the take-back left arm horizontal image, the top image, the downswing left arm horizontal image, the downswing shaft 9 o'clock image, the image previous to the impact image, the impact image, the image subsequent to the impact image, the follow-through shaft 3 o'clock image, and the finish image. The computer 16 synchronizes the photographing timing of the color CCD cameras 14 and 15 with each other. Therefore by selecting images synchronous with the check-point images in a front view, it is possible to extract check-point images viewed rearward (in side view) from the golfer in a ball fly line as shown in FIG. 11.

The coordinates of the positions of the attention-focused points necessary for diagnosing the swing of the golfer 11 are obtained for each of the check-point images.

Figure 12:
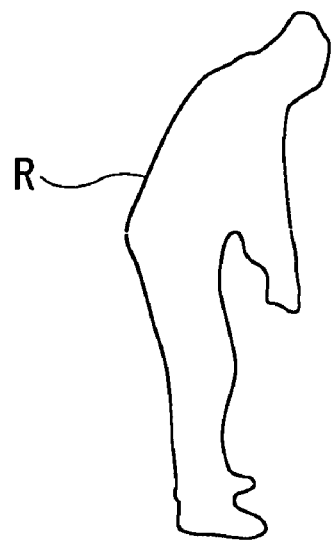
FIG. 12 shows the golfer's contour in a still image.
Figure 13:
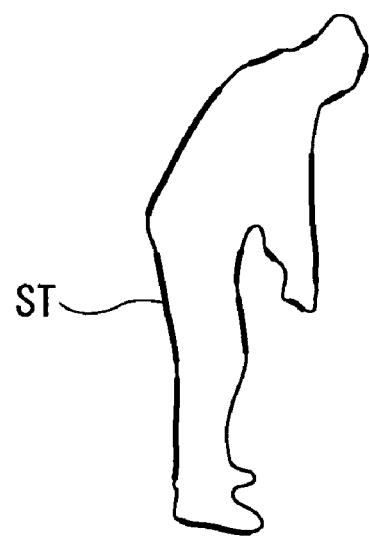
FIG. 13 shows a straight line portion extracted from the golfer's contour in the still image.

The silhouette of each check-point image is extracted to extract a contour R of the golfer 11, as shown in FIG. 12. The curvature of the contour R is obtained. As shown in FIG. 13, a straight line portion ST of the contour R is obtained (step S12). The method of obtaining the silhouette, the contour, and the curvature is as described above. The straight line portion ST is set in a portion where not less than five pixels having a curvature in the range from −10° to 10° are continuously present.

Thereafter the coordinate of the position of each of the colored marks M1 through M7 on the clothes 12 worn by the golfer 11 is recognized by using the search range S. Thereby the coordinate of the position of each of the attention-focused points of the golfer 11 is obtained (step S13).

Figure 14:
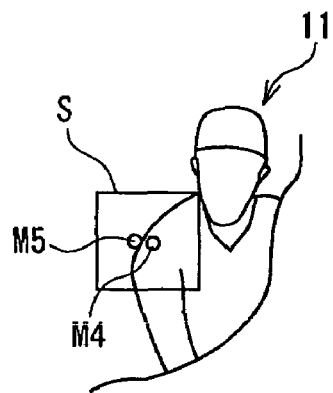
FIG. 14 is an explanatory view for explaining color extraction of an attention-focused point.

For example, the right shoulder of the address image (in front view) is extracted by examining the curvature of the contour R counterclockwise from the upper end (golfer's head) of the golfer 11. A pixel at which the curvature of the contour R has an extreme value is recognized as the right part of the neck of the golfer 11. As shown in FIG. 14, a range of 40 pixels in a negative direction of a Y-direction and 40 pixels in a positive direction of an X-direction is set as the search range S in which the right part of neck is set as the starting point disposed at an end of the search range S.

Within the search range S, differential processing is executed between the background image and the colored mark M4 (blue) disposed at the right shoulder or the colored mark M5 (red) also disposed at the right shoulder to judge whether R, G, and B of each differential pixel inside the search range S fall within the color range of the colored mark M4 or the colored mark M5. A pixel falling within the color range is regarded as the pixel displaying the colored mark M4 or the colored mark M5. As such, color extraction of the pixel is executed. Further the coordinate of the center of gravity of the pixel is obtained.

The conditions set on the color range of the colored marks M1 through M7 are as shown in table 1. A pixel satisfying one of the conditions is regarded as having the same color as that of one of the colored marks M1 through M7.

TABLE 1

|  |  | Hue | Saturation | Lightness |
|---|---|---|---|---|
| Colored mark M1 (left elbow) | Yellow | 30–60 | not less than 0.5 | not less than 100 |
| Colored mark M2 (left shoulder) Colored mark M5 (right shoulder) | Red | not more than 30 or not less than 330 | not less than 0.4 | 20–150 |
| Colored mark M3 (left shoulder) Colored mark M4 (right shoulder) Colored mark M6 (right elbow) | Blue | 190–230 | not less than 0.5 | not less than 50 |
| Colored mark M7 (waist) | Red | 330–360 | not less than 0.4 | 20–150 |

The area range of each of the colored marks M1 through M7 is set in advance. To improve recognition accuracy, a region having an area out of the set range is judged as not any one of the colored marks M1 through M7. On the other hand, a region having an area within the set range is recognized as one of the colored marks M1 through M7. In this embodiment, an area range having 5 to 60 pixels is recognized as one of the colored marks M1 through M7.

When recognition of the colored marks M1 through M7 executed by using the search range S has failed because the colored marks M1 through M7 are hidden or shaded or when an attention-focused point in which none of the colored marks M1 through M7 is present is desired to be recognized, the coordinate of the position of the attention-focused point is extracted by using the information of the contour (coordinate of contour R) of the golfer 11 or the curvature of the contour R (step S14).

Figure 15:
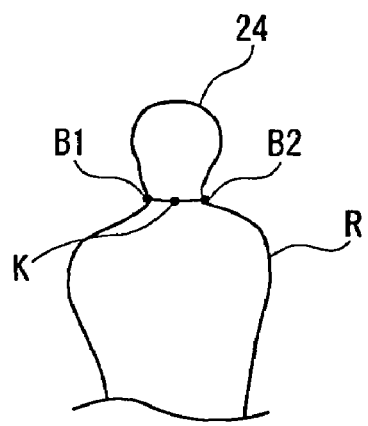
FIG. 15 is an explanatory view for explaining extraction of the attention-focused point executed by using the contour thereof.

For example, as shown in FIG. 15, as the method of extracting a head 24 in the address image and the impact image (in side view), a starting point in the extraction of the contour R is extracted as the head 24. That is, of pixels constructing the contour R, a pixel having a minimum value in a Y-coordinate is extracted as the head 24. As the method of extracting a neck K, curvatures of pixels are examined from the head 24 along the contour R. A midpoint between points B1 and B2 each having a maximum value in the curvature of the contour R is extracted as the neck K.

Figure 16:
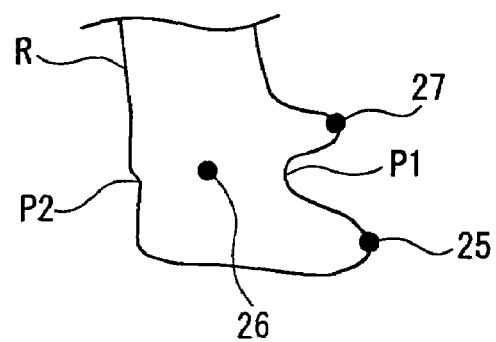
FIG. 16 is an explanatory view for explaining extraction of the attention-focused point executed by using an extreme value of the contour thereof.

As shown in FIG. 16, as the method of extracting a right toe 25 in the address image and the impact image (in side view), X-coordinates of pixels are examined counterclockwise from a lowermost point (maximum Y-coordinate value) of the contour R of the golfer 11. A pixel having a maximum X-coordinate value is extracted as the right toe 25.

As the method of extracting a right ankle 26, coordinates of pixels are examined counterclockwise from the right toe 25 along the contour R to extract a pixel P1 having a minimum X-coordinate value. Thereafter another pixel P2, disposed on the contour R, which has a Y-coordinate equal to that of the pixel P1 is found. The average of the coordinate of the pixel P1 and that of the pixel P2 is computed. Thereby the coordinate of the right ankle 26 is obtained.

As the method of extracting a left toe 27, coordinates of pixels are examined counterclockwise from the pixel P1 along the contour R. A pixel having a maximum X-coordinate value is extracted as the left toe 27.

When recognition of an attention-focused point executed by using the colored marks M1 through M7, the information of the contour R of the golfer 11 or the curvature of the contour R has failed, when an attention-focused point in which none of the colored marks M1 through M7 is present is desired to be recognized or when it is difficult to recognize an attention-focused point by using the curvature of the contour R, the coordinate of the position of the attention-focused point is extracted by using a straight line portion ST extracted on the contour R of the golfer 11 (step S15).

Figure 17:
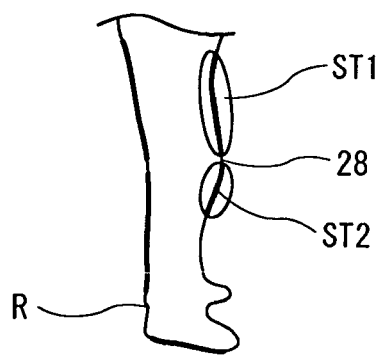
FIG. 17 is an explanatory view for explaining extraction of the attention-focused point executed by using a straight line portion of the contour thereof.

For example, as shown in FIG. 17, as the method of extracting a right knee 28 in the address image and the impact image (in side view), a pixel disposed at the intersection of extensions of upper and lower straight line portions ST1 and ST2 in a region of the contour R where the right knee 28 is supposed to be present is specified as the coordinate of the position of the right knee 28. More specifically, a virtual knee region is set in an area located at 30% to 40% upward from the lower end of the contour R to examine whether the lower end of the straight line portion ST1 and the upper end of the straight line portion ST2 are present in the virtual knee region. If a plurality of straight line portions is found in the examination, a straight line portion near the virtual knee region is selected. The intersection of the extension of the straight line portion ST1 and that of the straight line portion ST2 obtained in the above-described manner or a point whose Y-coordinate is coincident with that of the contour R and which has a maximum X-coordinate value is set as the right knee 28. If the straight line portions ST1 and ST2 cannot be found because the knee is not bent or for some reasons, a pixel disposed in the virtual knee region and having a maximum X-coordinate in the contour R is set as the right knee 28.

As described above, the lateral direction in the image is set as the X-axis. The vertical direction in the image is set as the Y-axis. The direction facing toward the right in the image is set as the positive direction in the X-coordinate. The direction facing downward in the image is set as the positive direction in the Y-coordinate. The direction clockwise with respect to the negative X-direction is set as the positive angle. The direction counterclockwise with respect to the negative X-direction is set as the negative angle.

Figure 18:
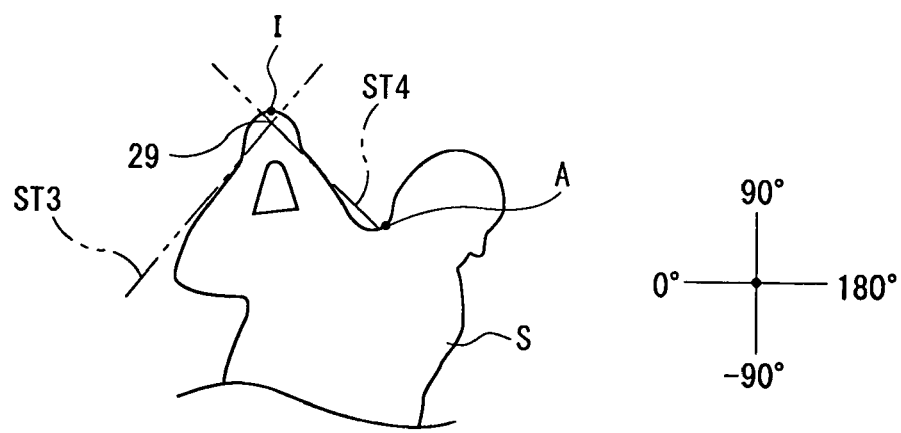
FIG. 18 is an explanatory view for explaining extraction of the attention-focused point executed by using a straight line portion of the contour thereof.

As the method of extracting a wrist 29 in the top image (in side view) initially, an initial point I (initial pixel found when pixels are scanned from upper left toward upper right and from top to bottom) of the silhouette S of the golfer 11 is obtained, as shown in FIG. 18. It is judged whether the X-coordinate of the initial point I is smaller than the X-coordinate of a rear part A of the neck obtained in the method (described later) carried out to extract attention-focused points in the take-back left arm horizontal image. If the X-coordinate of the initial point I is smaller than the X-coordinate of the rear part A of the neck, straight line portions ST3 and ST4 are extracted. The straight line portion ST3 set as an imaginary wrist has an inclination of 90° to 180° with respect to the initial point I. The straight line portion ST4 has an inclination of −90° to −180° with respect to the initial point I. The intersection of the straight line portion ST3 and the straight line portion ST4 is set as the wrist 29. If the straight line portions ST3 and ST4 cannot be extracted, the initial point I is set as the wrist 29.

Figure 19:
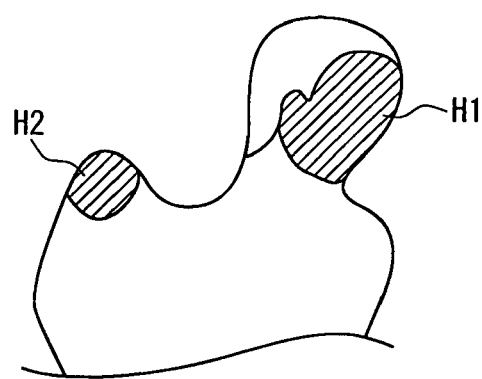
FIG. 19 is an explanatory view for explaining extraction of the attention-focused point executed by using a skin extraction.

On the other hand, if the X-coordinate of the initial point I is larger than the X-coordinate of the rear part A of the neck, as shown in FIG. 19, skin color extraction which will be described later is executed to obtain a face H1 of the golfer 11. Thereafter extraction of the skin color of the golfer's hand is executed to set the center of a skin color region H2 as the wrist 29.

When it is difficult to specify an attention-focused point, for example, a right knee in the top image (in side view) by using the contour R because no colored marks are present on the right knee and because the right knee is present inside the contour R, edge extraction is executed to obtain the line (including the inside of contour) of the golfer's body, based on a change of the brightness of pixels in the image, although not shown in the flowchart of FIG. 1. Thereby the position of the attention-focused point is recognized.

The procedure of extracting the coordinate of the position of the right knee in the top image (in side view) is described below. The basic flow of the extraction of the edge is as follows: generation of edge intensity image→generation of direction labeling image→generation of non-maximum value suppression labeling image.

Figure 20:
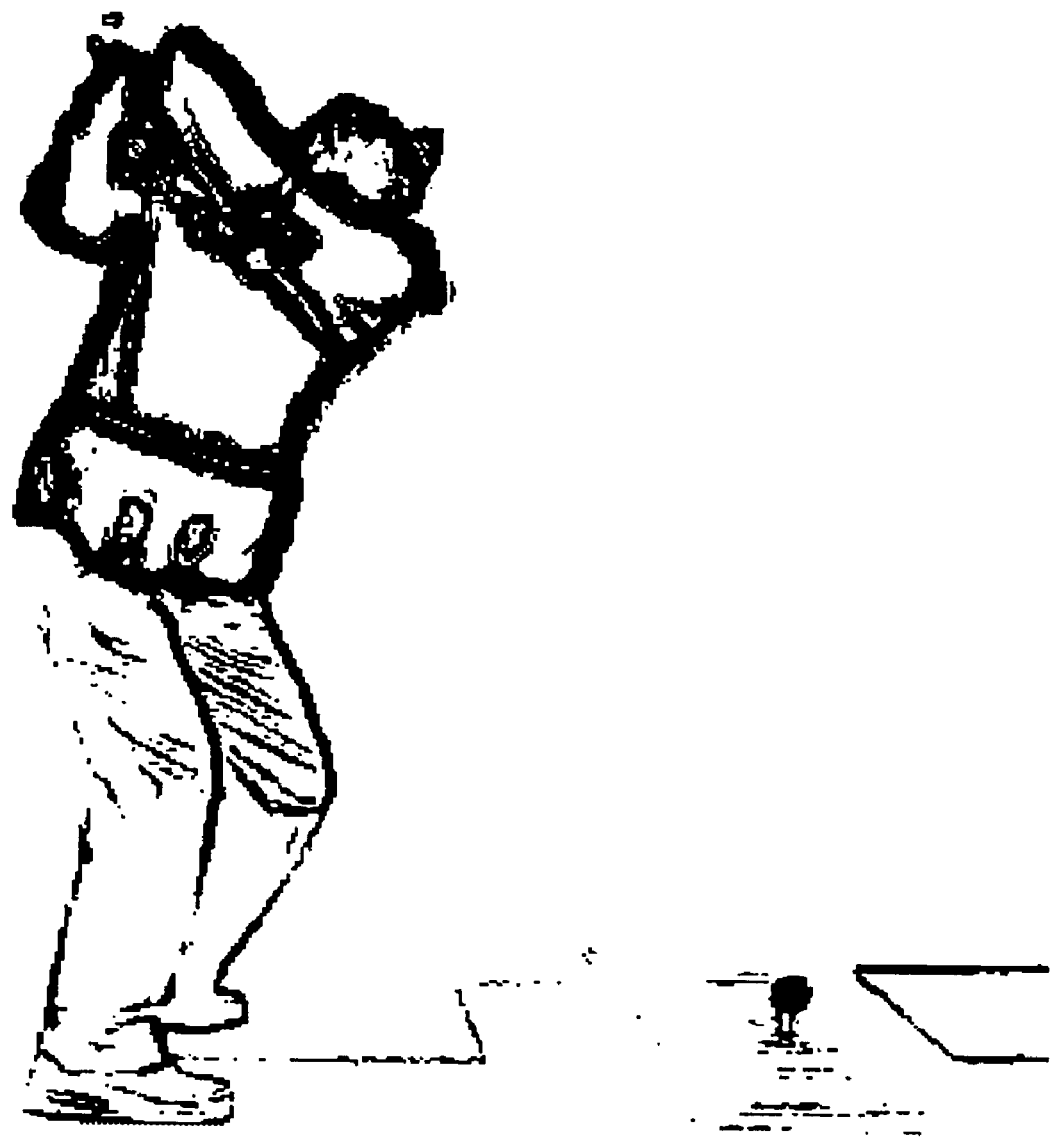
FIG. 20 shows an edge intensity image.

Initially an edge intensity image as shown in FIG. 20 is generated.

An edge intensity is extracted from the top image (in side view) by utilizing a Sobel operator.

The Sobel operator means a method of approximately finding a change of brightness by weighting brightness around a center to obtain a portion in an image where the brightness changes abruptly. Computations performed by utilizing the value of each of R, G, and B of a color image are shown below.

(1) Sobel intensity of color image in X-direction $Rx = Ar + 2Dr + Gr - Cr - 2Fr - Ir$ $Gx = Ag + 2Dg + Gg - Cg - 2Fg - Ig$ $Bx = Ab + 2Db + Gb - Cb - 2Fb - Ib$ Equation 14

Figures 23, 24:
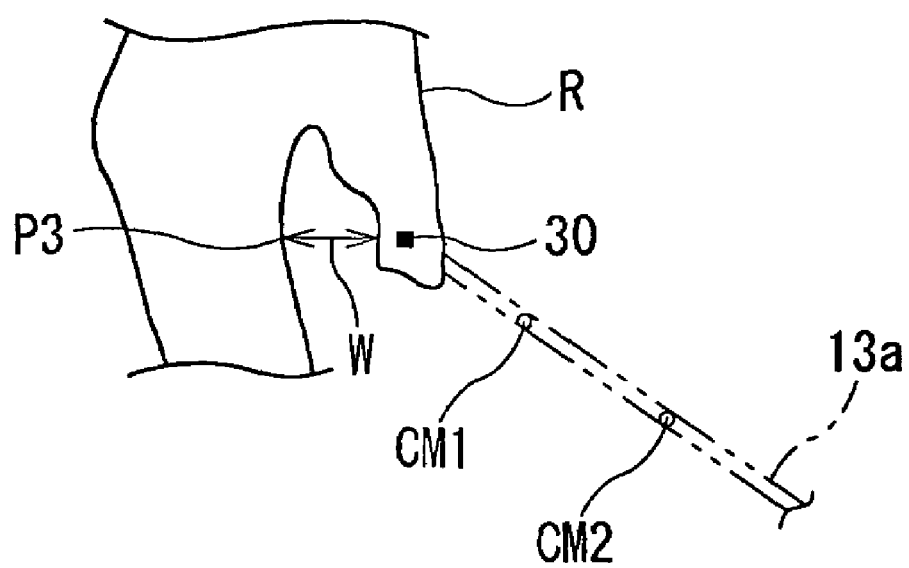
FIG. 23 is an explanatory view for explaining the definition of a positional relationship between adjacent pixels.
FIG. 24 is an explanatory view for explaining estimation of the attention-focused point executed by means of information of silhouette.

With reference to FIG. 23, supposing that a current attention-focused pixel is E and that eight pixels on the periphery of the pixel E are denoted as A through D and F through I, Ar is the value of R (red) of the pixel A, Ag is the value of G (green) of the pixel A, and Ab is the value of B (blue) of the pixel A. This is also applicable to Br, Bg, Bb to Ir, Ig, Ib. The coefficient of each variable means weighting.

In the direction of the Sobel intensity,
when Rx+Gx+Bx>0, sign=1, and
when Rx+Gx+Bx<0, sign=−1.
The Sobel intensity Dx in X-direction is as shown below:
Equation 15

$$Dx = \frac{\text{sign}\sqrt{Rx^2 + Gx^2 + Bx^2}}{8}$$

(2) Sobel intensity of color image in Y-direction is as shown below:

$Ry = Ar + 2Br + Cr - Gr - 2Hr - Ir$ $Gy = Ag + 2Bg + Cg - Gg - 2Hg - Ig$ $By = Ab + 2Bb + Cb - Gb - 2Hb - Ib$ Equation 16

In the direction of the Sobel intensity,
when Ry+Gy+By>0, sign=1, and
when Ry+Gy+By<0, sign=−1.
The Sobel intensity Dx in Y-direction is as shown below:

$$Dy = \frac{\text{sign}\sqrt{Ry^2 + Gy^2 + By^2}}{8}$$

(3) Sobel intensity of color image

Thus the Sobel intensity (edge intensity) DD of the color image is found by using an equation 18 shown below:

$$DD = \sqrt{Dx^2 + Dy^2}$$ Equation 18

A pixel having DD larger than a threshold (=10 in this embodiment) is set as the Sobel intensity (edge intensity). Pixels having a Sobel intensity DD not more than the threshold are set to zero. An edge intensity image whose edge intensity is indicated by the Sobel intensity of 256 gradations from 0 to 255 is obtained.

Figure 21:
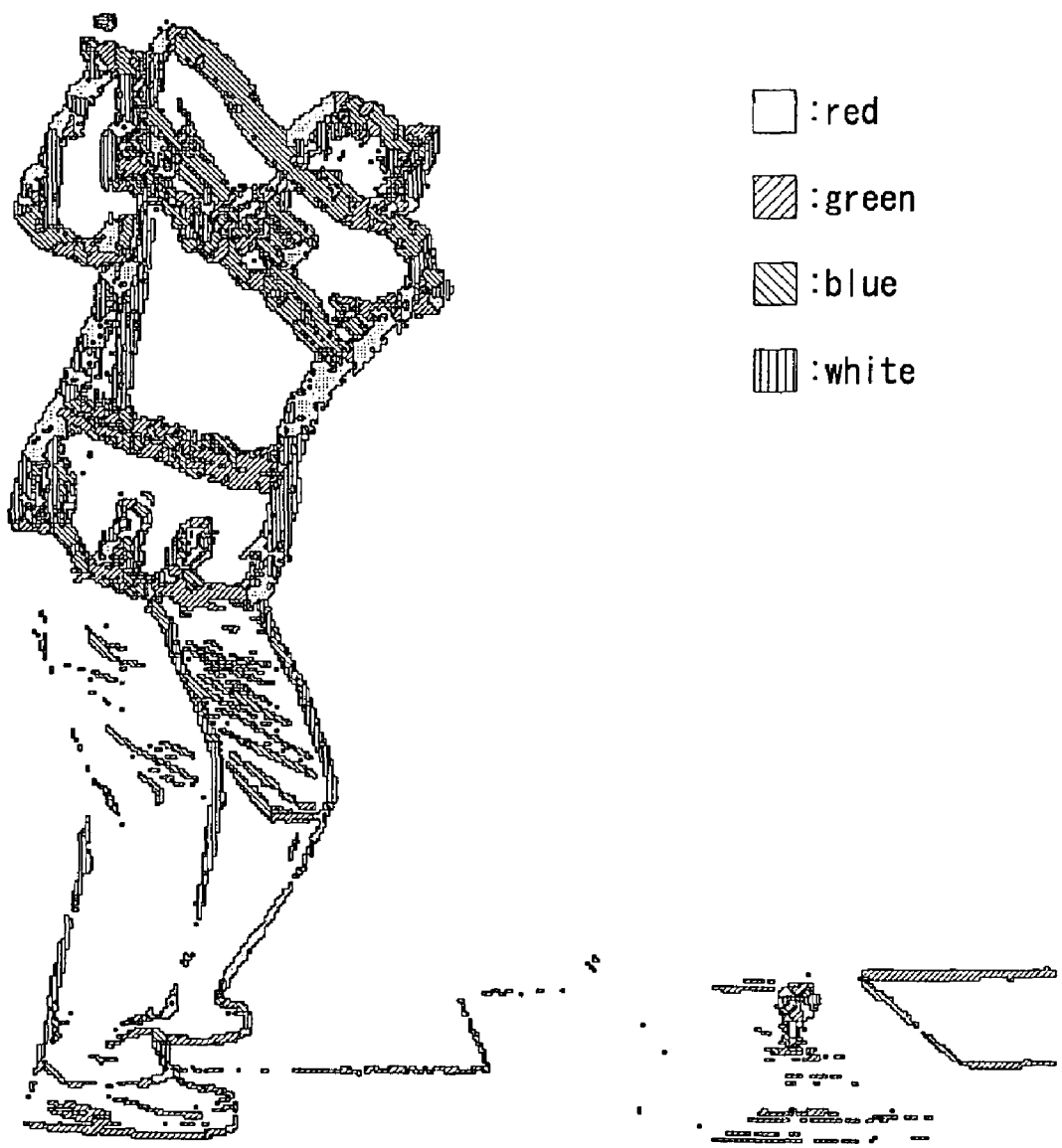
FIG. 21 shows a direction labeling image.

By using the edge intensity in each of the following four directions, the direction labeling image as shown in FIG. 21 is generated:

Supposing that tangent=dy/dx (dx is the Sobel intensity in the X-direction, and dy is the Sobel intensity in the Y-direction), When tangent<−tan(⅜π), the image is labeled as "3" and displayed in green.

When −tangent(⅜π)≦tangent<−tan(⅛π), the image is labeled as "4" and displayed in red.

When −tangent(⅛π)≦tangent<tan(⅛π), the image is labeled as "1" and displayed in white.

When tangent<tangent (⅜π), the image is labeled as "2" and displayed in blue.

In other cases, the image is labeled as "3" and displayed in green. In this case, the direction labeling image shown in FIG. 18 is obtained.

Figure 22:
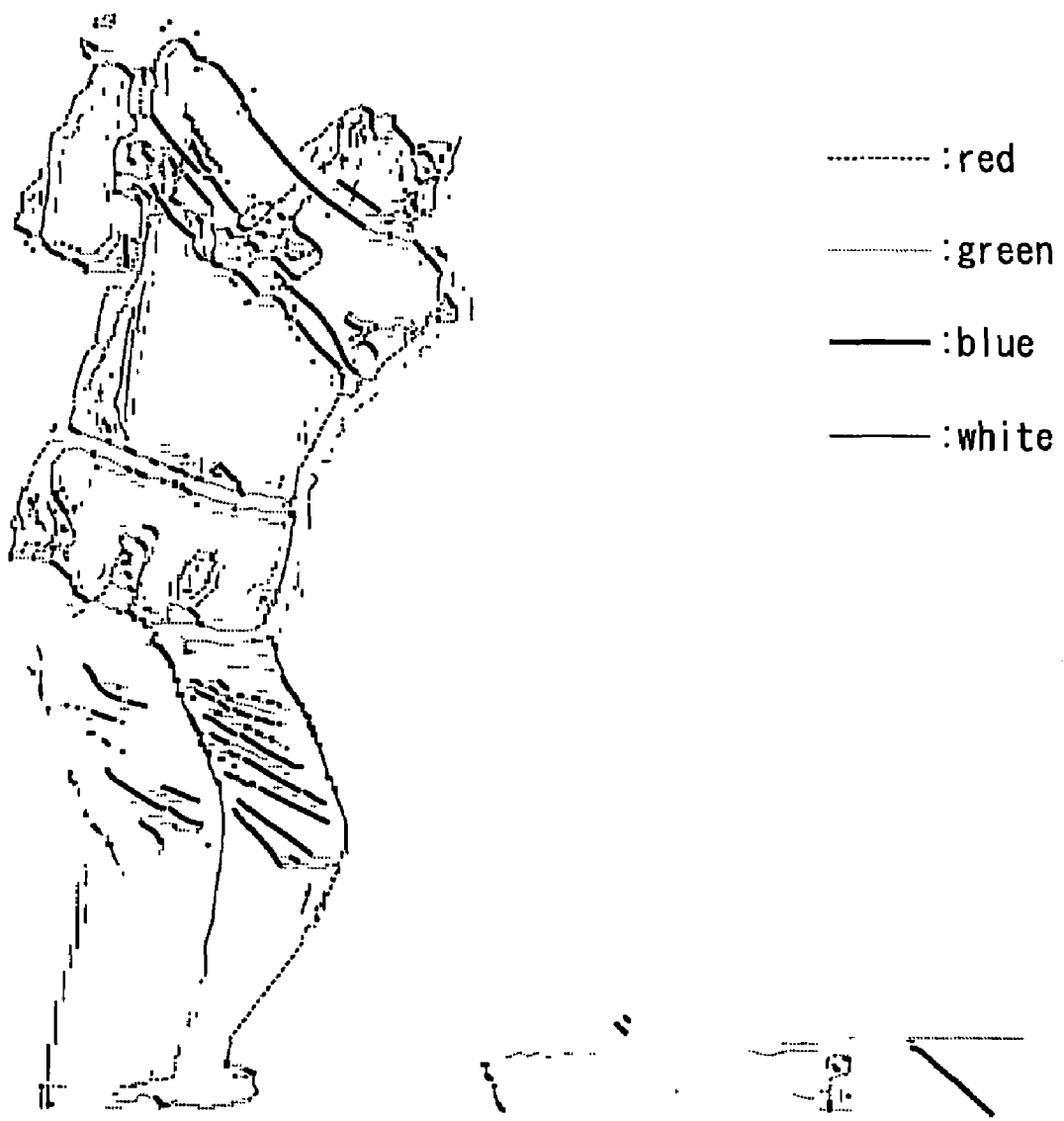
FIG. 22 shows a non-maximum value suppression labeling image.

By utilizing the above-described edge intensity image and direction labeling image, a non-maximum value suppression labeling image as shown in FIG. 22 is generated.

The non-maximum value suppression image means an image generated by extracting a portion thereof having a maximum intensity as an edge by utilizing the obtained edge intensity and a change direction of brightness.

To classify a non-maximum image into four directions, (1) When the Sobel intensity of a central pixel is larger than the Sobel intensities of pixels disposed in front of and behind the central pixel in the lateral direction (X-direction), the central position is regarded as a maximum position (white).

(2) When the Sobel intensity of the central pixel is larger than the Sobel intensities of the pixels disposed in front of and behind the central pixel in an oblique direction (upper left to lower right), the central position is regarded as a maximum position (red).

(3) When the Sobel intensity of the central pixel is larger than the Sobel intensities of the pixels disposed in front of and behind the central pixel in a vertical direction (Y-direction), the central position is regarded as a maximum position (green).

(4) When the Sobel intensity of the central pixel is larger than the Sobel intensities of the pixels disposed in front of and behind the central pixel in the oblique direction (lower left to upper right), the central position is regarded as a maximum position (blue).

The edge-extracted non-maximum value suppression labeling image shown in FIG. 22 is obtained in the manner described above.

As the final step in obtaining the coordinate of the position of the right knee, the intersection of a horizontal line passing through the position of the left knee obtained by using the straight line portions ST1 and ST2 of the contour R and the portion (white) of the non-maximum value suppression labeling image labeled as "1" is set as the right knee.

When it is difficult to recognize the attention-focused points by means of the colored marks M1 through M7, the contour information, the curvature or the edge extraction or when attention-focused points where no colored marks M1 through M7 are present are desired to be recognized, the coordinates of the positions of the attention-focused points are extracted by using silhouette information of the golfer 11 (step S16).

As an example, as shown in FIG. 24, as the method of finding a grip width W which is the distance between the golfer's body and the grip in the address image (in side view), a grip position 30 is found from a vector passing through the position of the colored marks CM1 and CM2. Further a pixel P3, disposed on the contour R, whose Y-coordinate is equal to that of the grip position 30 is found. In this method, it is necessary that the X-coordinate of the pixel P3 is smaller than that of the right toe. The distance between the grip position 30 and the pixel P3 is set as the grip width W.

The above-described coordinate of the position of the attention-focused point present on the golfer' body 11 in each check-point image is stored in the memory of the computer 16 (step S17). In the above-described manner, similar computations are performed until all the attention-focused points necessary for diagnosing the swing are extracted (step S18). That is, the coordinates of the positions of all the attention-focused points present on the golfer' body are not extracted in the check-point images, but only the attention-focused points necessary for diagnosing the swing are extracted in each check-point image. Thus the computing period of the time can be reduced.

The attention-focused points are extracted not in dependence on one image processing algorithm but in combination of a plurality of algorithms. Therefore irrespective of the form and swing motion of the golfer 11, the golf swing-measuring system is capable of recognizing the coordinate of the position of each attention-focused point present on the golfer' body 11 at a high percentage by making the most of all the attention-focused point extraction methods. In recognizing attention-focused points such as a knee of the lower half of the golfer's body, the golf swing-measuring system recognizes each attention-focused point not by the color extraction to be executed by using color marks but extracts the coordinate of the position of each attention-focused point by utilizing the above-described contour information, the edge or the like. Therefore the golf swing-measuring system has an advantage that it is unnecessary for the golfer 11 to wear clothes for measuring her/his golf swing on the lower half of the golfer 11.

Extraction of Attention-focused Point in Take-back Left Arm Horizontal Image (in Side View)

As an example of extracting attention-focused points by combining a plurality of algorithms with one another in one check-point image, extraction of the coordinate of the position of each attention-focused point in the take-back left arm horizontal image (in side view) is described below representatively.

As shown in FIG. 25, initially, processing of extracting the contour is executed (step S100). When the extraction of the contour R has failed (step S101), processing of the check-point image terminates (step S102). Description is made in detail below on the case where the extraction of the contour R has succeeded.

Golf Club

The color of the colored marks CM1 through CM3 is extracted by using the search range S to obtain the coordinate of the position thereof. If the extraction of the color of the colored marks CM1 through CM3 has failed (step S104), the processing is determined as failure. If the extraction of the color of the colored marks CM1 through CM3 has succeeded, the coordinate of the position of each of the colored marks CM1 through CM3 is stored (step S105).

Grip End and Center of Grip

If the extraction of the color of the colored marks CM1 through CM3 has failed at step S104, the processing is determined as failure (step S106). If the extraction of the color of the colored marks CM1 through CM3 has succeeded, a vector passing through the position of the CM1 nearest to the grip and the position of the colored mark CM2 adjacent to the colored mark CM1 is found to decide the position of the grip end and that of the center of the grip. More specifically, the coordinate of the position of the grip end and that of the center of the grip are computed by the following equations:

Grip end=(position of colored mark CM1)−$A$×(vector between marks)

Center of grip={(position of colored mark CM1)+ (grip end)}/2 where A is the ratio of the distance between the colored mark CM1 and the grip end to the distance between the colored marks CM1 and CM2.

Ground

The coordinate of the position of the lowermost pixel of the contour R is regarded as the ground (step S107).

Rear Part of Neck

Figure 27A:
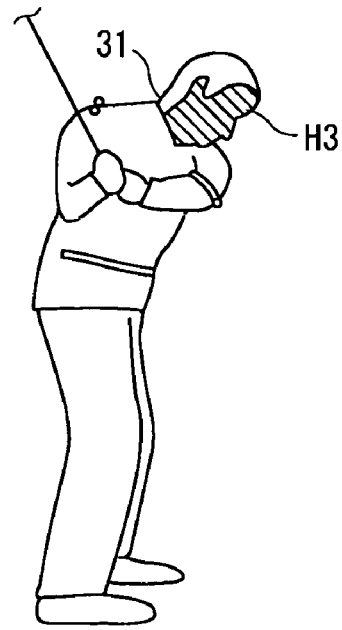
FIGS. 27A and 27B are explanatory views for explaining skin extraction.
Figure 27B:
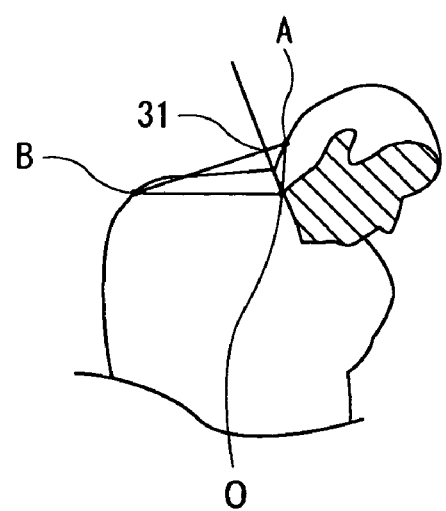

A region in which the golfer's head is present is narrowed from the silhouette region of the golfer 11. In the region, differential processing is executed by using the background image. Thereafter an aggregated region of pixels satisfying the following conditions is regarded as the skin (step S108). The conditions are as follows: hue=0 to 30, R=20 to 240, G=20 to 180, and B=not more than 180. The threshold of the area is set to the range of 30 to 1400 pixels when the aggregated region is regarded as the skin. As shown in FIGS. 27A and 27B, in an extracted skin color region H3, a contour point of a face region whose X-coordinate is minimum is denoted as O. A contour point having an X-coordinate equal to that of the contour point O and having a minimum Y-coordinate is denoted as A. A contour point having a Y-coordinate equal to that of the point O and having a minimum X-coordinate is denoted as B. The intersection of a straight line vertical to the inclination of a straight line AB and passing through the point O and the contour is specified as a rear part 31 of the neck (step S110).

When extraction of the skin color has failed (step S109) and when the coordinate of the position of the rear part 31 of the neck has been obtained in the address image (in side view, step S111), the intersection of the X-coordinate of the position of the rear part 31 of the neck in the address image (in side view) and the contour R in the take-back left arm horizontal image is computed. Curvatures of 10 pixels in front of and behind a pixel, disposed on the contour R, which has a smallest Y-coordinate are extracted from the intersection (step S112). A pixel having a curvature which is not more than zero and is minimum is specified as the rear part 31 of the neck (steps S113, S110).

When extraction of the rear part 31 of the neck has failed (step S111) or when extraction of the rear part 31 of the neck by using the curvature (step S113) has failed, a pixel disposed on the contour R, which is spaced by 90% of the height of the golfer's silhouette above the lower end thereof in its Y-coordinate and has a minimum X-coordinate is extracted as the rear part 31 of the neck (steps S114, S110).

Y-coordinate of Right Waist

Initially, the search range S is set in a range of −40 to 40 pixels in the X-direction and −60 to 20 pixels in the Y-direction. An average value (Y) of heights of the golfer's silhouette above the ground and the center of gravity of the silhouette are set as start points of the search range S. Thereafter the color of the belt-shaped colored mark M7 is extracted to obtain the Y-coordinate of the right waist (steps S115, S116).

When color extraction of the colored mark M7 has failed, a position spaced by 60% of the length of the golfer's silhouette above the lowermost end thereof is regarded as the Y-coordinate of the right waist (step S117).

Figure 26:
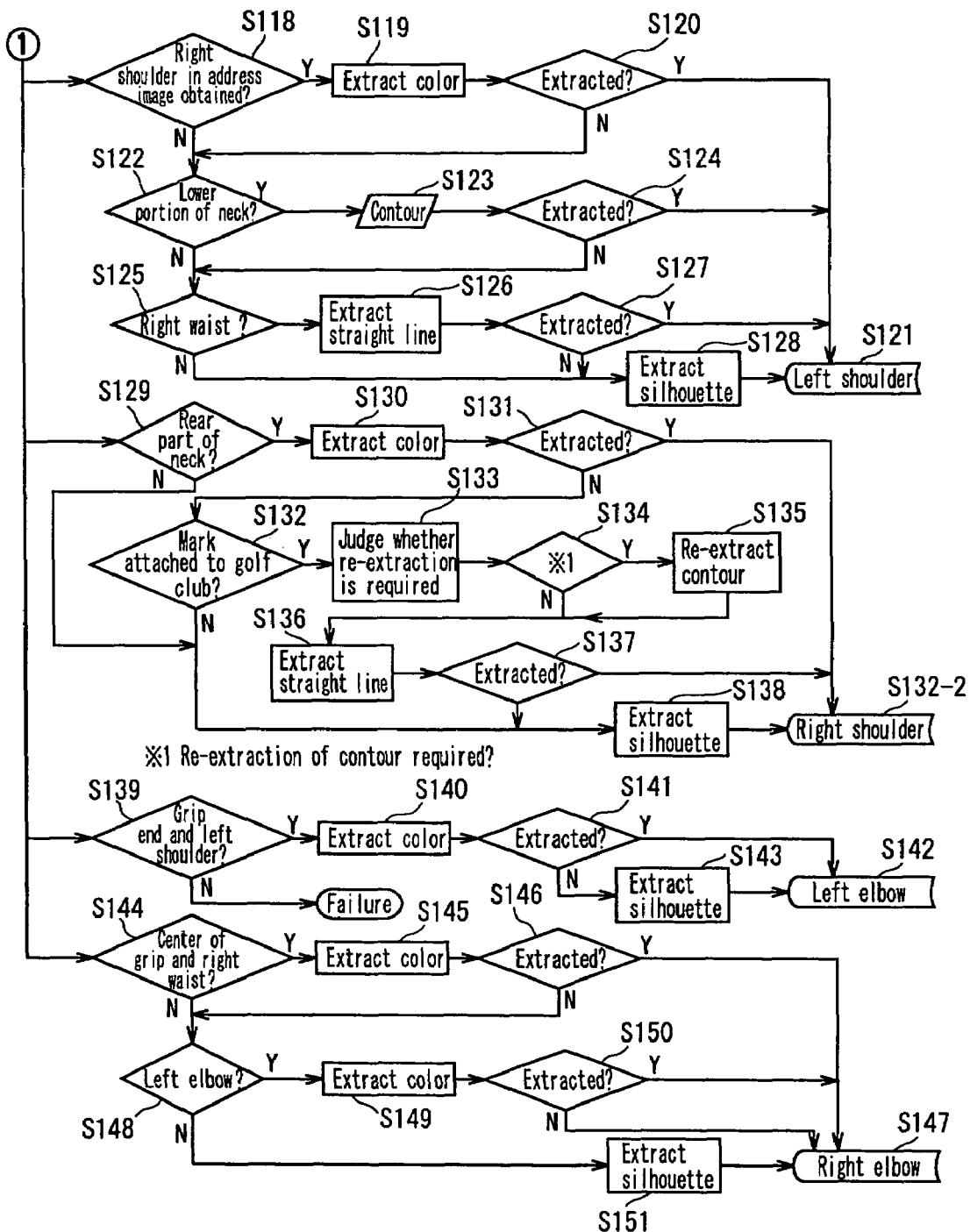
FIG. 26 is a flowchart showing a subroutine of a part of the flowchart of FIG. 25.

Extraction of left and right shoulders and left and right elbows is executed by calling a subroutine shown in FIG. 26 within FIG. 25.

Left Shoulder

Figure 28A:
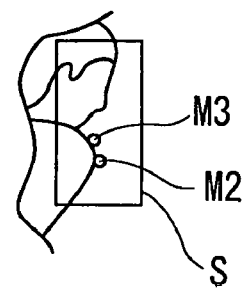
FIG. 28A shows extraction of the left shoulder by color extraction.

When the right shoulder in the address image (in side view) has been obtained (step S118), as shown in FIG. 28A, the search range S is set in a range of +40 pixels in the X-direction and ±40 pixels in the Y-direction with respect to the position of the right shoulder to execute color extraction of the colored mark M3 on the left shoulder (step S119). When the extraction of the colored mark M3 has succeeded, the coordinate thereof is stored as the left shoulder (steps S120, S121).

Figure 28B:
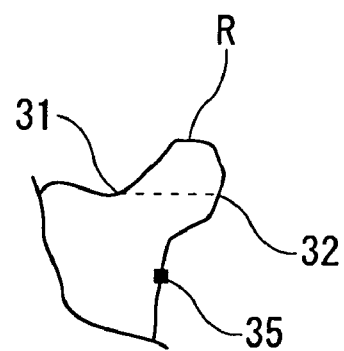
FIG. 28B shows extraction of the left shoulder by contour extraction.

When the extraction of the left shoulder in the address image (in side view, step S118) has failed and when the color extraction has failed (step S120), a pixel, disposed on the contour R, which has a Y-coordinate equal to the Y-coordinate of the rear part 31 of the neck is extracted as a lower portion 32 of the neck, as shown in FIG. 28B. Thereafter by using the information of rise and fall of the contour R obtained from the lower portion 32 of the neck, the left shoulder is decided (step S123).

More specifically, the contour R is examined clockwise from the lower portion 32 of the neck. When a mountain (maximum point) is found initially, the coordinate of the position of the left shoulder 35 is obtained as follows: a mountain within 30 pixels in the direction clockwise from the lower portion 32 of the neck→a valley (minimum point) within 30 pixels in the direction clockwise from the mountain→a mountain within 20 pixels in the direction clockwise from the valley.

When a valley (minimum point) is found initially in examining the contour R clockwise from the lower portion 32 of the neck, the coordinate of the position of the left shoulder 35 is obtained as follows: a valley within 30 pixels in the direction clockwise from the lower portion 32 of the neck→a mountain within 20 pixels in the direction clockwise from the valley (steps S124, 121).

Figure 28C:
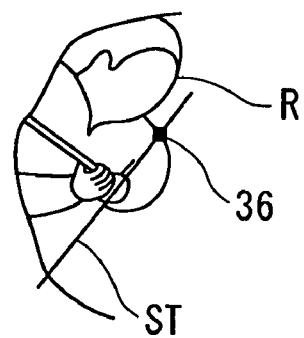
FIG. 28C shows extraction of the left shoulder by using a straight line portion.

When the extraction of the lower portion 32 of the neck has failed (step S122) or when the extraction by using the rise and fall of the contour R has failed (step S124), the straight line portion ST of the contour R is extracted at step S126 in a region from a right waist (step S125) to (Y-coordinate of right waist) to (Y-coordinate of right waist−30 pixels) in the Y-direction, as shown in FIG. 28C. The intersection of the straight line portion ST and the contour R is regarded as the left shoulder 36 (steps S127, S121). A pixel at the intersection is disposed at a position spaced by 80% to 90% of the length of the golfer's silhouette above the lowermost end thereof and has a minimum Y-coordinate. If extraction of the straight line portion has failed, the contour of (Y-coordinate of right waist) to (Y-coordinate of right waist−30 pixels) is used to extract a straight line by using the method of least square.

Figure 28D:
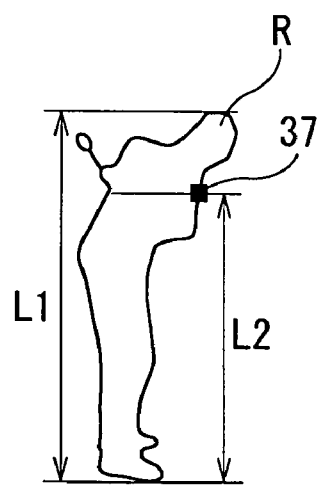
FIG. 28D shows extraction of the left shoulder by silhouette information.

When the right waist has not been found (step S125) or when the left shoulder has not been found at a position spaced by 80% to 90% of the length of the golfer's silhouette above the lowermost end thereof, as shown in FIG. 28D, a pixel having a maximum X-coordinate and disposed on the contour R at a position thereof spaced by 85% (L2/L1=0.85) of the length of the golfer's silhouette above the lowermost end thereof is stored as the coordinate of the position of the left shoulder 35 (steps S128, S121).

Right Shoulder

When extraction of the rear part 31 of the neck has succeeded (step S129), the search range S is set in a range of −50 pixels in the X-direction and ±20 pixels in the Y-direction by setting the position of the rear part 31 of the neck as a start point to execute color extraction of the colored mark M4 on the right shoulder (step S130). When the extraction of the colored mark M4 has succeeded, the coordinate thereof is stored as the right shoulder (steps S131, S132).

When the color extraction has failed (step S131) and when the extraction of the colored marks CM1 through CM3 has succeeded (step S132), it is judged (step S133) whether or not it is necessary to execute contour re-extraction processing of removing the contour of the shaft 13a intersecting with the contour R. If the contour of the shaft 13a is in intersection with that of the golfer's body (step S134), the contour re-extraction processing of removing the contour of the shaft 13a from the information of the contour is executed (step S135). If the shaft 13a does not appear on the contour, the contour re-extraction processing is not executed but straight line extraction processing is executed (step S136).

It is judged whether the straight line portion ST having an inclination of 190° to −180° is present on the contour R in the take-back left arm horizontal image at a position within ±10 from the Y-coordinate of the rear part of the neck in the take-back left arm horizontal image (in side view). It is also judged whether two straight line portions each having a downward inclination of 90° to 180° is present between the rear part of the neck and the Y-coordinate of the right waist. If the two straight line portions are found, the intersection thereof is stored as the right shoulder (steps S137, S132).

When the rear part of the neck cannot be found (step S129), when the colored marks CM1 through CM3 cannot be extracted (step S132), and when the two straight line portions have not been extracted (step S137), a pixel disposed on the contour R at a position thereof spaced by 80% of the length of the golfer's silhouette above the lowermost end thereof and having having a minimum X-coordinate is stored as the right shoulder (steps S138, 132).

Left Elbow

When extraction of the grip end and the left shoulder has failed (step S139), the processing is determined as failure. When the extraction of the grip end and the left shoulder have succeeded, the search range S is set in the range from the grip end to the left shoulder in the X-direction and in the range from the left shoulder to (grip end +40 pixels) in the Y-direction to extract the color of the colored mark M1 on the left elbow (step S140). If the extraction of the colored mark M1 has succeeded, the coordinate thereof is stored as the left elbow (steps S141, S142). If the extraction of the colored mark M1 has failed, the midpoint between the left shoulder and the grip end is extracted by regarding it as the left elbow (steps S143, S142).

Right Elbow

When the extraction of the center of the grip and the right waist in the address image (in side view) has succeeded (step S144), the search range S is set in the range of ±50 pixels in the X-direction and ±50 pixels in the Y-direction by setting the position of the center of the grip as the starting point to execute color extraction (step S145) of the colored mark M6 mounted on the right elbow after excluding the extracted skin color portion, a portion in the vicinity of the shaft, and a region below the right waist in the address image (in side view) from the search range S. When the extraction of the colored mark M6 has succeeded, the coordinate thereof is stored as that of the right elbow (steps S146, S147).

When the extraction of the center of the grip and the right waist in the address image (in side view) have failed (step S144) or the color extraction has failed (step S146), the search range S is set in a range of ±25 pixels in the X-direction and ±25 pixels in the Y-direction by setting contour points whose Y-coordinate are equal to that of the left elbow and whose X-coordinates are minimum as starting points to execute color extraction of the colored mark M6 mounted on the right elbow (step S149). When the extraction of the colored mark M6 has succeeded, the coordinate thereof is obtained as the coordinate of the position of the right elbow (step S150).

When the extraction of the left elbow has failed (step S148), a contour point which has a minimum X-coordinate and is disposed on the contour R at a position thereof spaced by 65% of the length of the golfer's silhouette above the lowermost end thereof in −Y direction is set as the right elbow (steps 151, 147). When the color extraction has failed (step S150), the starting point of the search range used in the second color extraction is set as the right elbow (step S147).

Spine Axis

With reference to the flowchart shown in FIG. 25, when the extraction of the right waist and the rear part 31 of the neck has succeeded and when the color extraction of the right shoulder has succeeded (step S152), an offset movement is executed in such a way that the straight line portion ST passes through the rear part 31 of the neck with the angle of the straight line portion kept, supposing that the straight line portion ST is present on the contour R between the right shoulder and the right waist (step S153). Thereby a spine axis (line connecting center between right and left waists and neck to each other) can be obtained (steps S154, S155).

When the color extraction of the right shoulder has failed (step S152) and when the extraction of the right waist and the rear part of the neck has failed, the processing is determined as failure. When the extraction of the right waist and the rear part of the neck has succeeded, the contour R between the rear part of the neck and a contour point intersecting with the Y-coordinate of the right waist and having a minimum X-coordinate is used to obtain the spine axis by performing the method of least square of the straight line portion.

X-coordinate of Right Waist

When the extraction of the Y-coordinate of the right waist and the spine axis has failed (step S159), the processing is determined as failure. On the other hand, when the extraction thereof has succeeded, a pixel having a Y-coordinate equal to that of the right waist is specified on the spine axis. Thereby the X-coordinate of the right waist can be obtained (steps S160, S161).

As described above, it is possible to obtain the coordinate of the position of the attention-focused points of the take-back left arm horizontal image (in side view) by making the most of a plurality of image processing algorithms, as shown in the flowcharts of FIGS. 25 and 26.

The second embodiment of the present invention is described below.

Figure 29:
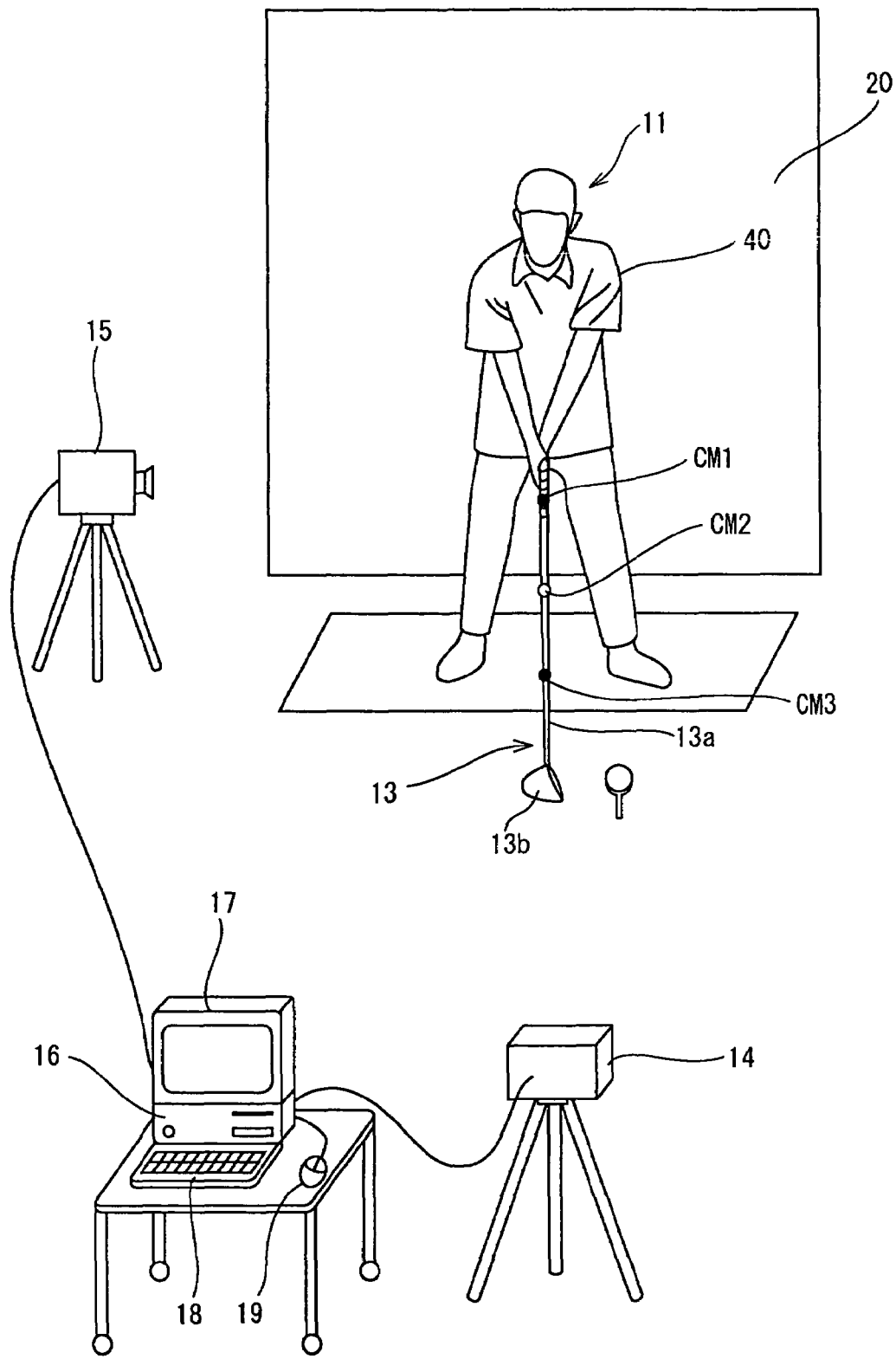
FIG. 29 shows the construction of a golf swing-measuring system of a second embodiment of the present invention.

In the second embodiment, as shown in FIG. 29, a golfer 11 (right-handed) whose golf swing is to be diagnosed wears a shirt with half-length sleeve 40. No colored marks are attached to the golfer' body.

The method of obtaining coordinates of the positions of the attention-focused points present on the golfer' body 11 is described below.

Initially, a background image in which only the background 20 is photographed by the color CCD cameras 14, 15 is read. A still image for each frame of the swing image is captured into the computer 16 through the color CCD cameras 14, 15, and the data of each of obtained still images is stored in the hard disk, the memory in the computer 16 or the memory of the board.

Thereafter the following check-point images useful for diagnosing the swing are automatically extracted from a large number of still images constituting the moving image of the swing: an address image, a take-back shaft 8 o'clock image, a take-back shaft 9 o'clock image, a take-back left arm horizontal image, a top image, a downswing left arm horizontal image, a downswing shaft 9 o'clock image, an image previous to impact image, an impact image, an image subsequent to impact image, a follow-through shaft 3 o'clock image, and a finish image (step S111).

As described above, the check-point images are automatically extracted from a large number of still images constituting the moving image of the swing. Thus this method has an advantage that computations are performed only for the above-described check-point images in performing computations of extracting the coordinates of the positions of the attention-focused points present on the golfer' body 11 by using the skin extraction processing and the like which are executed in a subsequent step.

The method of automatically extracting each check-point image is similar to that of the first embodiment and thus description thereof is omitted herein.

The coordinates of the positions of the attention-focused points necessary for diagnosing the swing of the golfer 11 are obtained for each of the check-point images.

Coordinate of Position of Right Elbow

Figure 30:
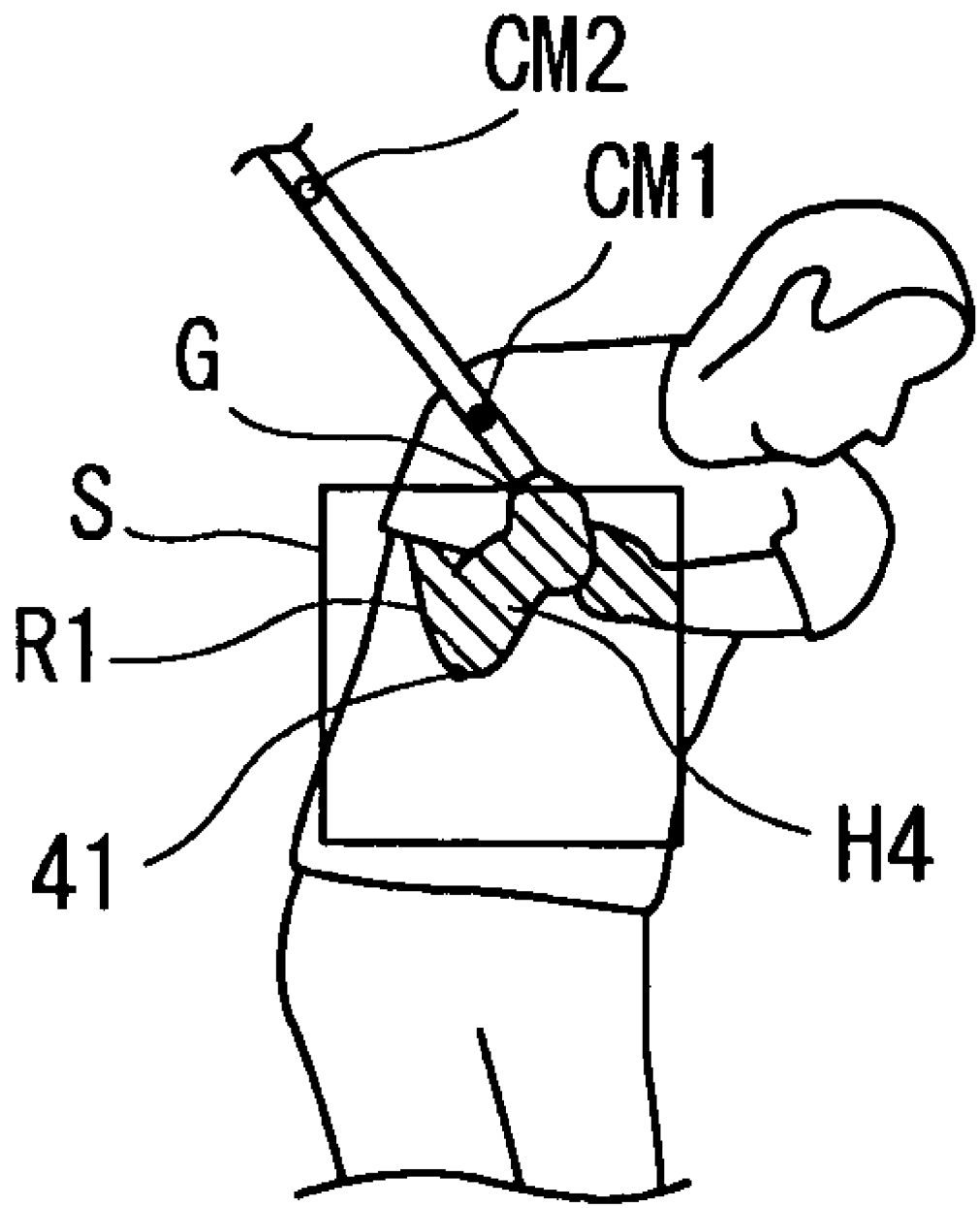
FIG. 30 is an explanatory view for explaining extraction of a right elbow.

FIG. 30 shows the method of obtaining the coordinate of the position of the right elbow which is one of the attention-focused points in the take-back left arm horizontal image (in side view).

Initially, the coordinate of the position of a grip end G is found. A vector between the colored mark CM1 nearest to the grip and the colored mark CM2 adjacent to the colored mark CM1 is found to decide the grip end. More specifically, the grip end is computed by the following equations:

Grip end=(position of colored mark CM1)−$A$×(vector between marks)

Center of grip={(position of colored mark CM1)+ (grip end)}/2 where A is the ratio of the distance between the colored mark CM1 and the grip end G to the distance between the colored marks CM1 and CM2.

The search range S is set in a range of ±40 pixels in the X-direction with respect to the grip end G set as the starting point and ±60 pixels in the Y-direction with respect to the grip end G. After differential processing is executed for pixels inside the search range S, an aggregated region of pixels satisfying the condition (color range) of hue=0 to 30, R=20 to 255, G=20 to 180, and B=not more than 180 is regarded as a skin color region H4. A contour R1 of the skin color region H4 is obtained by using the above-described method. The coordinate of the position of a right elbow 41 is obtained from a pixel disposed on the contour R1 farthest from the grip end G.

Figure 31:
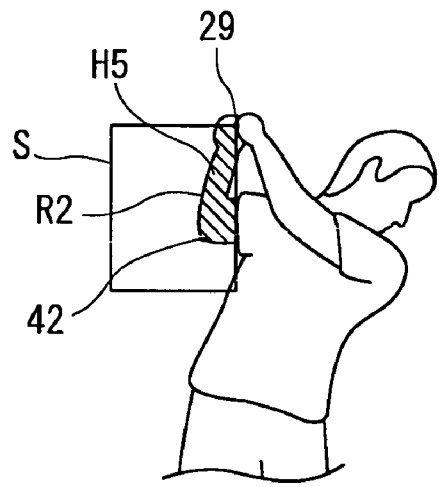
FIG. 31 is an explanatory view for explaining extraction of the right elbow.

FIG. 31 shows the method of obtaining the coordinate of the position of the right elbow which is one of the attention-focused points in the top image (in side view). Initially, the coordinate of the position of a wrist 29 is found by using a procedure similar to that of the first embodiment (FIGS. 18 and 19).

The search range S is set in a range of −60 pixels in the X-direction with respect to the wrist 29 set as the starting point and +100 pixels in the Y-direction with respect to the wrist 29. After differential processing is executed for pixels inside the search range S, an aggregated region of pixels satisfying the condition (color range) of hue=0 to 30, R=20 to 255, G=20 to 180, and B=not more than 180 is regarded as a skin color region H5. A contour R2 of the skin color region H5 is obtained. The coordinate of the position of a right elbow 42 is obtained from a pixel, disposed on the contour R2, which is farthest from the wrist 29.

Coordinate of Position of Left Elbow

Figure 32:
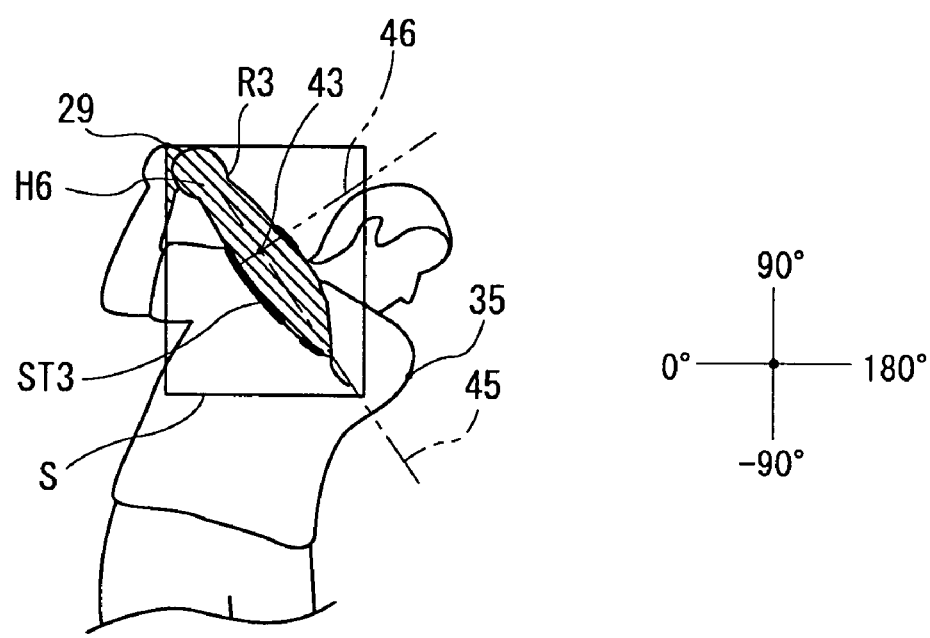
FIG. 32 is an explanatory view for explaining extraction of a left elbow.

FIG. 32 shows the method of obtaining the coordinate of the position of a left elbow 43 which is one of the attention-focused points in the top image (in side view).

The search range S is set in a range of +60 pixels in the X-direction with respect to the obtained wrist 29 set as the starting point and +80 pixels in the Y-direction with respect to the wrist 29. After differential processing is executed for pixels inside the search range S, an aggregated region of pixels satisfying the conditions (color range) of hue=0 to 30, R=20 to 255, G=20 to 180, and B=not more than 180 is regarded as a skin color region H6. A contour R3 of the skin color region H6 is obtained. A portion of the contour R3 in which not less than five pixels having a curvature in the range of −10° to 10° are continuously present is extracted as a straight line portion (thick line in FIG. 32). A straight line portion having an inclination of 0° to 90° is selected as a representative straight line portion ST3.

Thereafter a straight line 45 is obtained. The straight line 45 has an inclination equal to that of the representative straight line portion ST3 and passes through an average value of the center of gravity positions of the above-described straight line portions is obtained. A straight line 46 is obtained. The straight line 46 passes through the midpoint of a line connecting the left shoulder 35 obtained in a procedure similar to that of the first embodiment shown in FIG. 28B and the obtained wrist 29 to each other and has an inclination shown by the reciprocal of the inclination of the above-described line.

The coordinate of the position of the attention-focused points of the golfer 11 in the obtained check-point image is stored in the memory of the computer 16. Based on the coordinate of the position of each attention-focused point, the swing of the golfer 11 is diagnosed. Other construction of the second embodiment are similar to those of the first embodiment. Thus description thereof is omitted herein.

What is claimed is:

1. A golf swing-measuring system comprising:
a computer for capturing a colored moving image obtained by photographing a golfer who swings by gripping a golf club,
wherein said computer selects and extracts one or more images each showing a swing posture as check-point images, including an address image, a take-back shaft 8 o'clock image, a take-back shaft 9 o'clock image, a take-back unskillful arm horizontal image, a top image, a downswing unskillful arm horizontal image, a downswing shaft 9 o'clock image, an impact image, a follow-through shaft 3 o'clock image, and a finish image, and extracts from a large number of still images constituting said colored moving image, and obtains coordinates of positions of attention-focused points that operate in said check-point images when said golfer swings;
wherein when a colored mark is provided on at least one of said attention-focused points, a search range which is a region in which presence of said colored mark is estimated is set in said check-point image, and a color range which is an allowable range in which color information of a pixel in said image is regarded as the same as that of a reference color of said colored mark is set, and a coordinate of a position of each of said attention-focused points is obtained in said search range by regarding a pixel whose color falls in said color range as a position of said color mark,
wherein when a colored mark is not provided or when the provided colored mark is not found on the displayed image on at least one of said attention-focused points, differential processing is executed between said check-point image and a background image in which a golfer is not photographed to obtain a golfer's silhouette and extract a contour of said silhouette, a portion of said obtained contour where not less than a predetermined number of pixels having curvatures in a range from −10° to 10° are continuously present is extracted as a straight line portion, and a coordinate of a position of said attention-focused point is specified by using said straight line portion, and
wherein a pixel present at a position where an extension of said straight line portion intersects with said contour is specified as a coordinate of a position of said attention-focused point.

2. The golf swing-measuring system according to claim 1, wherein said attention-focused point includes a golfer's head, neck, shoulder, elbow, waist, knee, ankle, wrist or/and toe.

3. The golf swing-measuring system according to claim 1, wherein said attention-focused point includes a golfer's silhouette, a color of a golfer's wear, a golfer's gloves or/and a golfer's skin color.

4. The golf swing-measuring system according to claim 1, wherein the differential processing is executed between said check-point image and the background image to extract the golfer's silhouette by using hue, saturation and lightness of said check-point image and the background image.

5. A golf swing-measuring system comprising:
a computer for capturing a colored moving image obtained by photographing a golfer who swings by gripping a golf club,
wherein said computer selects and extracts one or more images each showing a swing posture as check-point images, including an address image, a take-back shaft 8 o'clock image, a take-back shaft 9 o'clock image, a take-back unskillful arm horizontal image, a top image, a downswing unskillful arm horizontal image, a downswing shaft 9 o'clock image, an impact image, a follow-through shaft 3 o'clock image, and a finish image, and extracts from a large number of still images constituting said colored moving image, and obtains coordinates of positions of attention-focused points that operate in said check-point images when said golfer swings;

wherein when a colored mark is provided on at least one of said attention-focused points, a search range which is a region in which presence of said colored mark is estimated is set in said check-point image, and a color range which is an allowable range in which color information of a pixel in said image is regarded as the same as that of a reference color of said colored mark is set, and a coordinate of a position of each of said attention-focused points is obtained in said search range by regarding a pixel whose color falls in said color range as a position of said color mark, wherein when a colored mark is not provided or when the provided colored mark is not found on the displayed image on at least one of said attention-focused points, differential processing is executed between said check-point image and a background image in which a golfer is not photographed to obtain a golfer's silhouette and extract a contour of said silhouette, a portion of said obtained contour where not less than a predetermined number of pixels having curvatures in a range from $-10°$ to $10°$ are continuously present is extracted as a straight line portion, and a coordinate of a position of said attention-focused point is specified by using said straight line portion, and wherein a pixel present at a position where extensions of two of said straight line portions intersect with each other or a point of a contour present nearest to said intersection position is specified as a coordinate of a position of said attention-focused point.

6. The golf swing-measuring system according to claim 5, wherein said attention-focused point includes a golfer's head, neck, shoulder, elbow, waist, knee, ankle, wrist or/and toe.

7. The golf swing-measuring system according to claim 5, wherein said attention-focused point includes a golfer's silhouette, a color of a golfer's wear, a golfer's gloves or/and a golfer's skin color.

8. The golf swing-measuring system according to claim 5, wherein the differential processing is executed between said check-point image and the background image to extract the golfer's silhouette by using hue, saturation and lightness of said check-point image and the background image.

* * * * *